(12) United States Patent
Khan et al.

(10) Patent No.: US 12,135,622 B2
(45) Date of Patent: *Nov. 5, 2024

(54) DYNAMIC HARDWARE RESOURCE SHADOWING AND MEMORY ERROR PROTECTION

(71) Applicant: Cisco Technology, Inc., San Jose, CA (US)

(72) Inventors: Riaz Khan, Milpitas, CA (US); Peter Geoffrey Jones, Campbell, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/484,765

(22) Filed: Oct. 11, 2023

(65) Prior Publication Data

US 2024/0036993 A1 Feb. 1, 2024

Related U.S. Application Data

(63) Continuation of application No. 18/164,246, filed on Feb. 3, 2023, now Pat. No. 11,822,437, which is a continuation of application No. 16/542,191, filed on Aug. 15, 2019, now Pat. No. 11,599,424.

(51) Int. Cl.
*G06F 11/14* (2006.01)
*G06F 3/06* (2006.01)
*G06F 13/40* (2006.01)

(52) U.S. Cl.
CPC ........ *G06F 11/1469* (2013.01); *G06F 3/0608* (2013.01); *G06F 3/0652* (2013.01); *G06F 3/0673* (2013.01); *G06F 13/4027* (2013.01); *G06F 2201/82* (2013.01)

(58) Field of Classification Search
CPC .................. G06F 11/1469; G06F 2201/82
See application file for complete search history.

(56) References Cited

U.S. PATENT DOCUMENTS

| | | | |
|---|---|---|---|
| 7,240,364 B1 * | 7/2007 | Branscomb | H04L 61/4541 726/5 |
| 2010/0188412 A1 * | 7/2010 | Li | G06T 1/60 345/557 |
| 2020/0349087 A1 * | 11/2020 | Kucherov | G06F 3/0608 |

* cited by examiner

*Primary Examiner* — Jigar P Patel
(74) *Attorney, Agent, or Firm* — Patterson + Sheridan, LLP

(57) ABSTRACT

Embodiments of the present disclosure are directed to dynamic shadow operations configured to dynamically shadow data-plane resources in a network device. In some embodiments, the dynamic resource shadow operations are used to locally maintain a shadow copy of data plane resources to avoid having to read them through a bus interconnect. In other embodiments, the dynamic shadow framework is used to provide memory protection for hardware resources against SEU failures. The dynamic shadow framework may operate in conjunction with adaptive memory scrubbing operations. In other embodiments, the dynamic shadow infrastructure is used to facilitate fast boot-up and fast upgrade operations.

20 Claims, 19 Drawing Sheets

| Data plane resource address | Host CPU Local Memory address | In-line Synchronized |
|---|---|---|
| 0x0000A0D1 | 0x00000001 | 0 |
| 0x0000A0D2  602 | 0x00000002  604 | 0  606 |
| 0x0000A0D3 | 0x00000003 | 0 |
| 0x0000A0D4 | 0x00000004 | 0 |
| 0x0000A0D5 | 0x00000005 | 1 |
| ... | ... | |
| 0x0A000FF0 | 0x00001001 | 0 |
| 0x0A000FF1 | 0x00001002 | 1 |
| 0x0A000FF2 | 0x00001003 | 1 |
| 0x0A000FF3 | 0x00001004 | 1 |
| 0x0A000FF4 | 0x00001005 | 0 |

*FIG. 6*

| Error hits | Data plane resource Memory address | Data plane resource Device id. | System Component id. |
|---|---|---|---|
| | 0x00010000 - 0x0018FFE8 | 0x00000001 | 0x0000 |
| | 0x00030000 - 0x001AFFE8 | | |
| | 0xDDD00000 - 0xDDE7FFE8 | 0x00000002 | |
| | 0xDAA00000 - 0xDAB7FFE8 | 0x00000003 | |
| | 0x0004A000 – 0x00349FE8 | 0x00000001 | 0x0001 |
| | ... | ... | |
| | 0x00949FBB – 0x0049FA3 | 0x00000004 | |
| | 0x0049FA4 – 0x00F49F8C | | |
| | 0x00F49F8D – 0x01249F75 | | |
| | 0x01249F76 – 0x01539F5E | 0x00000005 | |
| | 0x01539F5F – 0x01839F46 | | |

*FIG. 11*

DYNAMIC HARDWARE RESOURCE SHADOWING AND MEMORY ERROR PROTECTION

CROSS-REFERENCE TO RELATED APPLICATIONS

This application is a continuation of U.S. patent application Ser. No. 18/164,246, filed Feb. 3, 2023, which is a continuation of U.S. Pat. No. 11,599,424, filed Aug. 15, 2019, both of which are incorporated by reference herein in their entireties.

TECHNICAL FIELD

Embodiments of the present invention relate to networking equipment, in particular, hardware architecture and resource shadow operations of networking equipment.

BACKGROUND

In networking equipment, data-plane devices such as route/network processors and switching ASICs have on-chip resources or near-chip resources (e.g., memories and registers) that determine the various packet-processing functions. These data-plane resources (also referred to herein as data-plane device resources) are often structured in tables, such as MAC address tables, FIB table, RIB tables, ACL tables, among others information and data. Such data-plane resources are spread over large areas of memory and are treated as non-cacheable.

Traditional memory/disk caching techniques, as well as traditional shadowing techniques, do not work for data-plane resources because unpredictable access patterns of data-plane resources make locality of reference ineffective for packet processing applications. Locality of references generally refers to the tendency of a processing unit (e.g., microprocessor/host CPU) to access a same set of memory location repetitively over a short period of time. Indeed, locality of references can include spatial locality as well as temporal locality, and locality of references is a key tenant of CPU memory caching. Examples of CPU memory caching include L1, L2, and L3 cache. Disk caching stores files from a hard disk in memory of the hard disk or in the system memory to improve hard disk access time by the CPU. Traditional shadow technique, e.g., Volume Snapshot Service, Volume Shadow Copy Service or VSS, maintains two or more identical copies of computer files or volumes for backup or snapshots purposes.

In addition to unpredictable access patterns that makes locality of references ineffective, there are massive quantities of data-plane resources that further make traditional caching and shadowing techniques ineffective or impractical. Further, data-plane resources tend to be sparsely populated and interspersed over a large device' memory map and are updated independent of a host CPU or host CPU memory controller. Further, and as equally important, transactions involving data-plane resources should be pushed to the data-plane synchronously and immediately. To this end, data-plane resources are accessed by a host CPU as needed. Most of these accesses involve a CPU directed controller (i.e., driver) fetching information associated with data plane resources from the data-plane devices over an interconnect such as a PCI/PCIe. The term "fetch" and "read" are used interchangeably herein and generally refers to a retrieving operation of information by transacting for that information over a bus interconnect.

Next-generation data-plane devices and network device architecture may put greater burden on host CPUs, among other resources, e.g., memory error detection and correction, as such devices may be configured with more data-plane resources, e.g., larger and greater number of tables, that may amount to multi-gigabytes of data.

BRIEF DESCRIPTION OF THE DRAWINGS

The accompanying figures, which are incorporated herein and form part of the specification, illustrate transmit power control of access point with active feedback. Together with the description, the figures further serve to explain the principles of the multi-level resource reservation described herein and thereby enable a person skilled in the pertinent art to make and use the transmit power control of access point with active feedback.

FIG. 6 shows an example list of shadowed resources, e.g., maintained by the data place access driver, in accordance with an illustrative embodiment.

FIG. 11 shows an example database maintained by a SER memory profiler of FIG. 8, in accordance with an illustrative embodiment.

DESCRIPTION OF THE EXAMPLE EMBODIMENTS

Overview

Figure 1:
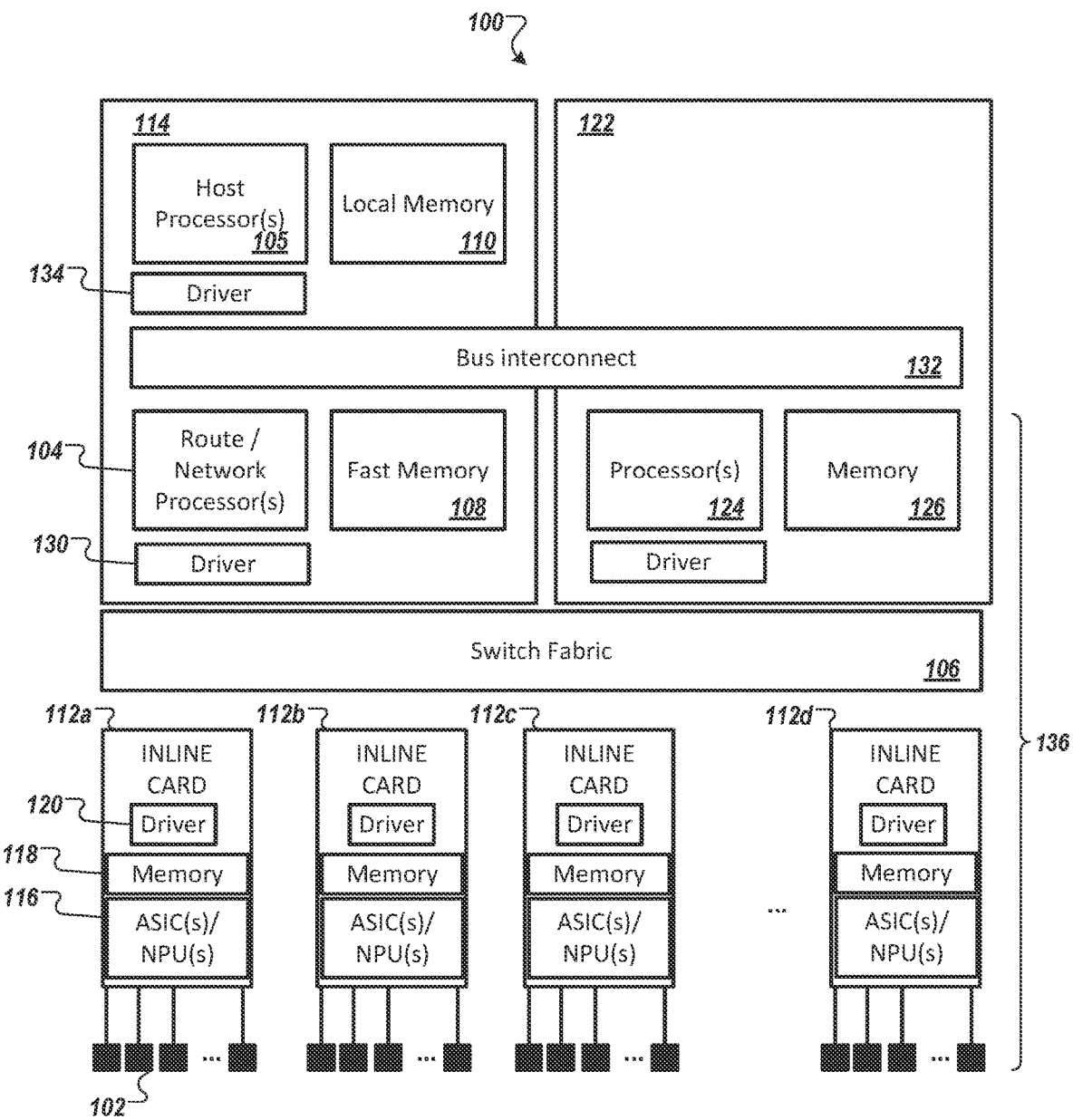
FIG. 1 is a diagram of a network device configured to perform dynamic shadow operation in accordance with an illustrative embodiment.

In an aspect, an embodiment of the present disclosure is directed to dynamic shadow operations configured to dynamically shadow data-plane resources in a network device.

The term "dynamic" in dynamic shadow operation, as used herein, refers to the shadowing of dynamically maintained list or set of resources, specifically, data-plane resources. That is, resources are added to the list of resources maintained by a dynamic shadow module on an on-going basis and resources on such list can be re-allocate and removed also on an on-going basis. These resources may include data-plane associated resources, such as MAC address table(s), FIB table(s), RIB table(s), ACL table(s), and any other tables, register contents, content address memory (CAM) contents, tertiary content address memory (TCAM) contents, binary content-addressable memory (BCAM) contents, and memory contents (e.g., non-persistent, volatile, etc.) maintained or used by data-plane devices used in the switching (i.e. forwarding and/or routing) of packets through the networking equipment. In addition to being used for forwarding/routing operations, data-plane resources are also used in control-plane management operation, bootup operation, data-plane device upgrade operation, and/or maintenance and management operations, among others. Data-plane resources may include resource that are internal, or on-chip, to the data-plane device as well as off-chip resources that are accessible by the data-plane device.

The term "data-plane device", as used herein, generally refers to a processing unit involved in switching and/or routing of packets in the network device as part of the data-plane. Data-plane devices may include network processors (NPUs), route processors (RPs), switching-ASICs (application-specific integrated circuit), switching FPGA (field-programmable gate array), CPLD (complex programmable logic device), and the like. Data-plane devices are part of the data-plane, which further includes data-plane resources, e.g., those listed above, operatively coupled to, or are part of, the data-plane devices.

The term "host CPU", as used herein, generally refers to cores of a microprocessor or microcontroller, e.g., having RISC or CISC architecture, that are configured to execute computer instructions within the framework of an operating system.

Notably, the dynamic resource shadow operations are used, in some embodiments, to locally maintain a shadow copy of data plane resources (e.g., tables or portion thereof) likely to be needed by a host CPU in the host CPU's local memory (e.g., DRAM, SRAM, etc.) to avoid having to read them through the bus interconnect that connects between the host CPU and the data-plane (which is conventionally performed for forwarding applications). Read operations from the state-of-the-art bus interconnect, i.e., PCI-express (also referred to herein as PCIe), though fast and have improved over time over prior bus technology, have latencies typically around 1300 ns (for non-posted transactions). In contrast, similar read operations from standard local memory often used in networking equipment (i.e., DRAM) have latencies typically around ns (almost a 20-fold difference as compared to PCIe). Faster classes of DRAM having lower latency read are also available, in some instances approaching 20 ns; and latencies of faster memory technology (e.g., SRAM) are even lower, typically around 2-3 ns. For certain applications and processes, e.g., MAC address learning, dynamic resource shadow operations have been shown to provide a greater than ten-fold improvement in throughput performance.

To improve operability and extend the improvement to all services/applications executing at the host CPU, in some embodiments, the dynamic resource shadow operations employs a data-plane access driver configured to check whether a given read access request of a given data plane resource has a corresponding shadow copy. And, where the shadow copy exists, the data-plane access driver is configured to access the lower-latency shadow copy and avoid a high-latency read access of the bus interconnect to improve throughput performance.

In another aspect, a generic infrastructure is disclosed that leverages the dynamic shadow framework to provide memory protection for hardware resources against SEU failures. The protection may thus extend system uptime and integrity. Specifically, the framework may be used to provide protection against memory errors and minimize unexpected system behavior, unexplained errors, random system crashes, and security related hacking.

In another aspect, a generic infrastructure is disclosed that leverages the dynamic shadow framework to provide shadow copies of data plane resources as a proxy for data plane devices (e.g., ASICs). Because the time to create data plane resources (e.g., MAC learning tables, RIB tables, ACL tables, etc.) for forwarding processes/applications can be in the order of minutes, a reboot of data place devices (ASIC, network processor, route processor) and the subsequent building of such data plane resources may disrupt network operations for such time period. By creating shadow copies of data plane resources independent of data plane operations, the shadowed resources may be used to flush the data plane resources during a reboot of the corresponding data place devices, thus reducing network disruption/down time to the time to perform the flush, which may be in the order of seconds. Indeed, this use of the dynamic shadow infrastructure can facilitate fast boot-up and fast upgrade operations.

With respect to fast upgrades, although upgrades are available for applications and operating system executing on the host CPU, because of the disruption to the network, such upgrades are often deferred until more substantial upgrades are required or scheduled. To this end, security and bug fixes may persist for longer duration on a given network equipment. Further, in some operating environments, e.g. realtime controls in factory automation and such, disruption of network connectivity for a minute or more may cause the entire operation line to reset. Reducing disruption time during minor upgrades to a few seconds may increase the frequency that upgrades are performed, thereby improving overall system health and security.

In an aspect, a network device (e.g. switch) is presented comprising a memory; a bus interface (e.g., PCIe) that interfaces with a data-plane device resource associated with the data-plane device; and a processor unit or logic circuit (e.g., data-plane access driver) configured to: receive a request for a read access to a data-plane resource (e.g., table), or a portion thereof (e.g., entries), over a bus interconnect (e.g., PCIe); determine whether the data-plane resource, or the portion thereof, has a corresponding shadow copy stored in local memory operatively connected to a host processor (e.g., wherein the host processor comprises the processor unit or logic circuit); perform a read access of the data-plane resource, or the portion thereof, over the bus interconnect (e.g., PCIe) upon a determination that the data-plane resource, or the portion thereof, does not have a shadow copy; and perform a read of the shadow copy associated with the data-plane resource, or the portion thereof, upon a determination that the data-plane resource, or the portion thereof, has the shadow copy.

In some embodiments, the processor unit or logic circuit (e.g., shadow memory profiler) is further configured to: track executed read accesses of a plurality of data-plane resources, or portion thereof, in corresponding plurality of tracked profiles of the plurality of data-plane resources, or portion thereof; determine whether a tracked profile of the plurality of tracked profiles meets a predefined criterion to create a shadow copy of a data-plane resource associated with the tracked profile; and direct creation of the shadow copy of a data-plane resource associated with the tracked profile when the predefined addition criterion is met.

In some embodiments, the processor unit or logic circuit (e.g., shadow services agent) is further configured to: receive a request to create the shadow copy of the data-plane resource associated with the tracked profile; and create the shadow copy of the data-plane resource associated with the tracked profile.

In some embodiments, the processor unit or logic circuit (e.g., shadow memory profiler) is further configured to track executed read accesses of a plurality of data-plane resources, or portion thereof, in corresponding plurality of tracked profiles of the plurality of data-plane resources, or portion thereof; track executed read of a shadow copy of a given data plane resource; determine whether a tracked profile of the plurality of tracked profiles meets a predefined criterion to remove a shadow copy of a given data-plane resource associated with the tracked profile; and direct deletion of the shadow copy of the given data-plane resource when a predefined deletion criterion is met.

In some embodiments, the processor unit or logic circuit (e.g., via inline synchronization) is configured to create the shadow copy of the data-plane resource associated with the tracked profile by instantiating a structure of the shadow copy, wherein the structure comprises a plurality of shadow elements, wherein each shadow element of the plurality of shadow elements is instantiated with a null or placeholder value; and populating a given shadow element of the shadow copy upon a read access of a data plane resource instance being read from the bus interconnect, wherein subsequent read access request of the data plane resource instance is performed as read of the given shadow element of the shadow copy.

In some embodiments, the processor unit or logic circuit (e.g., via inline synchronization) is configured to populate each shadow element of the shadow copy upon a read access of a respective data plane resource instance being retrieved from the bus interconnect, wherein subsequent read access requests of the respective data plane resource instances are performed as reads of the shadow elements of the shadow copy.

In some embodiments, the processor unit or logic circuit (e.g., via resource replay) is configured to instantiate a structure of the shadow copy; and direct recreation of a set of data plane resources from configuration data of a control plane resource.

In some embodiments, the predefined criterion to create the shadow copy of the data-plane resource associated with the tracked profile includes a condition selected from the group consisting of the tracked profile meeting or exceeding a pre-defined frequency threshold of missed profiling of the data plane resource or of hits that the data plane resource has been profiled; a calculated weighted moving average associated with the data-plane resource meeting or exceeding a pre-defined threshold of missed profiling of the data plane resource or of hits that the data plane resource has been profiled; a calculated weighted moving average of percentage associated with a percentage the data-plane resource meeting or exceeding a pre-defined threshold of missed profiling of the data plane resource or of hits that the data plane resource has been profiled; a calculated percentage of hits or misses for a pre-defined set of access events; and a calculated throughput yield factor meeting or exceeding a pre-defined value.

In some embodiments, the predefined criterion to remove the shadow copy of the given data-plane resource associated with the tracked profile includes a condition selected from the group consisting of an inactivity timer; the tracked profile meeting or exceeding a pre-defined frequency threshold of read access not being performed on the shadow copy; the tracked profile meeting or exceeding a pre-defined percentage of read access of the shadow copy over a total number of read access of all shadow copies; a calculated weighted moving average of percentage associated with a percentage the tracked profile meeting or exceeding a pre-defined frequency threshold; a calculated weighted moving average associated with a percentage the tracked profile meeting or exceeding a pre-defined frequency threshold; and a calculated throughput yield factor (or some throughput yield associated metric) associated with shadow copy having a lowest value among all calculated throughput yield factors associated with other shadow copies.

In some embodiments, shadowed resource of data plane resources can be automatically removed when associated hardware resource is decommissioned or temporarily removed by the system administrator.

In some embodiments, the operation to determine whether the data-plane resource, or the portion thereof, has the corresponding shadow copy (e.g., performed via the data plane access driver) comprises accessing a list of shadow resources; and determining whether an address or identifier associated with the data-plane resource, or the portion thereof, is located in the list.

In some embodiments, the processor unit or logic circuit (e.g., data plane access driver) is further configured to add an address or identifier associated with a given data-plane resource to a list of shadow resources upon a shadow copy of the given data-plane resource having been created.

In some embodiments, the processor unit or logic circuit (e.g., data plane access driver) is further configured to remove an address or identifier associated with the given data-plane resource from the list of shadow resources upon the shadow copy of the given data-plane resource having been deleted.

In some embodiments, the data plane resource is associated with a table selected from the consisting of a media access control (MAC) address table, a forwarding information base (FIB) table, a routing information base (RIB) table, an access control list (ACL) table, and an address resolution protocol (ARP) table, wherein the shadow copy comprises all table entries of the data-plane resource.

In some embodiments, the data plane resource is associated with at least one of a media access control (MAC) address table, a forwarding information base (FIB) table, a routing information base (RIB) table, an access control list (ACL) table, and an address resolution protocol (ARP) table, wherein the shadow copy comprises a portion of entries of the data-plane resource.

In some embodiments, the data-plane resource is used by the data-plane device for one or more operations selected from the group consisting of: routing operation, forwarding operation, control-plane management operation, bootup operation, data-plane device upgrade operation, and maintenance and management operations.

In some embodiments, the processor is a host CPU.

In some embodiments, the logic circuit is part of an ASIC (e.g., switching ASIC, NPU, ASIC/CPLD on host board, etc.), FPGA, CPLD, network processor, routing processor (e.g., switching ASIC/FPGA, ASIC/FPGA on a host board, etc.).

In some embodiments, the data-plane device is selected from the group consisting of a network processor (NPU), a route processor (RP), and a switching-ASIC.

In some embodiments, the data-plane resource is selected from the group consisting of: contents of cache; contents of CAM; contents of B CAM; contents of TCAM; register-files; and memories in or associated with data plane devices.

In some embodiments, the processor or logic circuit (e.g., dynamic shadowing prediction module) is further configured to generate a resource usage pattern model for a set of data-plane resources based on the generated profile of the data-plane resource and profiles of other data-plane resources; and create a shadow copy of a data-plane resource based on the generated model.

In another aspect, claims for SER memory protection is provided. In some embodiments, a network device (e.g., switch) is presented comprising a memory; and a processor unit or logic circuit (e.g., SER recovery agent) configured to receive a memory error notification from a data plane, wherein the memory error notification is associated with a data-plane resource (e.g., table), or a portion thereof (e.g., entries); determine whether the data-plane resource, or the portion thereof, has a corresponding shadow copy stored in the memory; and perform a correction of the data-plane resource based on the shadow copy when the data-plane resource, or the portion thereof, is determined to have the shadow copy.

In some embodiments, the processor unit or logic circuit (e.g., SER recovery agent) is further configured to direct regeneration a copy of the data-plane resource by recreating the data plane resource from configuration data of a control plane resource, wherein the recreated data plane resource is used to correct the data plane resource associated with the memory error notification.

In some embodiments, the processor unit or logic circuit (e.g., replay manager) is further configured to retrieve configuration data of the control plane resource from a control plane database; and recreate the data plane resource from retrieved configuration data of the control plane resource.

In some embodiments, the processor unit or logic circuit (e.g., SER recovery agent) is further configured to direct, or perform, memory scrubbing of all instances in the data-plane resource based on the shadow copy.

In some embodiments, the processor unit or logic circuit (e.g., SER recovery agent) is further configured to direct, or perform, memory scrubbing of one or more data-plane resources having a determined association to the data-plane resource in error.

In some embodiments, the processor unit or logic circuit (e.g., SER memory profiler) is further configured to track memory error notification received for a given data plane resource and/or associated data plane hardware in a tracked profile for the given data plane resource; and determine whether the tracked profile of the given data plane resource meets a predefined criterion to create a shadow copy of the given data-plane resource.

In some embodiments, the processor unit or logic circuit (e.g., SER memory profiler) is further configured to track memory error notification received in association with other data-plane resources and other associated data plane hardware in the tracked profile for the given data plane resource or in a second tracked profile; determine whether the tracked profile of the given data plane resource or second tracked profile meet a predefined criterion (e.g., with a time window); and wherein the other data-plane resources or other associated data plane hardware are also scrubbed in conjunction with the given data plane resource.

In some embodiments, the processor unit or logic circuit (e.g., shadow services agent) is further configured to receive a request to create the shadow copy of the data-plane resource; and create the shadow copy of the data-plane resource.

In some embodiments, the processor unit or logic circuit (e.g., via inline synchronization) is configured to create the shadow copy of the data-plane resource by instantiating a structure of the shadow copy, wherein the structure comprises a plurality of shadow elements, wherein each shadow element of the plurality of shadow elements is instantiated with a null or placeholder value; and populating a given shadow element of the shadow copy upon a read access of a data plane resource instance being read from the bus interconnect.

In some embodiments, the processor unit or logic circuit (e.g., via resource replay) is configured to instantiate a structure of the shadow copy; and direct recreation of a set of data plane resources from configuration data of a control plane resource.

In some embodiments, the processor unit or logic circuit (e.g., adaptive memory scrubber) comprises one or more on-demand queues to receive request to perform a memory scrub; and a plurality of patrol queues for a plurality of data plane resources and hardware resources.

In some embodiments, the one or more on-demand queue, including a first priority queue and a second priority queue.

In some embodiments, the processor unit or logic circuit (e.g., adaptive memory scrubber) is configured to perform memory scrubbing based on requests in the priority queue prior to performing memory scrubbing based on requests in the plurality of patrol queues.

In some embodiments, the processor unit or logic circuit (e.g., adaptive memory scrubber) is configured to perform memory scrubbing based on requests in the first priority queue prior to performing memory scrubbing based on requests in the second priority queue; and perform memory scrubbing based on requests in the second priority queue prior to performing memory scrubbing based on requests in the plurality of patrol queues.

In some embodiments, the plurality of patrol queues are defined in a weighted round robin (WRR) configuration.

In some embodiments, the one or more on-demand the plurality of patrol queues, collectively, form a hierarchical scheduler.

In some embodiments, the shadow copy is created from a static pre-defined list (e.g., user updateable).

In some embodiments, the memory error notification via polling or via an interrupt.

In some embodiments, the memory error notification is associated with a soft event upset (SEU) error.

In some embodiments, the data plane resource is associated with at least one of a media access control (MAC) address table, a forwarding information base (FIB) table, a routing information base (RIB) table, an access control list (ACL) table, and an address resolution protocol (ARP) table.

Example System

FIG. 1 is a diagram of a network device 100 configured to perform dynamic shadow operation in accordance with an illustrative embodiment. As discussed above, dynamic shadowing operation refers to the shadowing of dynamically-adjusted list or set of resources, specifically data-plane resources. In FIG. 1, the network device 100 is configured as a network switch and is shown comprising a plurality of ports 102 coupled to forwarding engine implemented in a route or network processor 104 via a bus structure 106 (shown as "switch fabric" 106). Route or network processors 104 can be used to execute routing protocols, e.g., by maintaining routing information and forwarding table(s). The route or network processor 104 may have access to fast memory 108 (such as ternary content-addressable memory (TCAM), CAM, SRAM, buffers, etc.) and local memory 110 (e.g., dynamic random-access memory (DRAM), SRAM)).

The route or network processor 104 may communicate with a host processor 105 (also referred to herein as a host CPU and shown as "Host Processor(s)" 105). As discussed above, a host CPU generally refers to a core of a microprocessor or microcontroller, e.g., having RISC or CISC architecture, that is configured to execute general computer instructions (i.e., applications, middleware) within the framework of an operating system. Here, computer instructions generally refer to general instructions, preferably, that are prepared not to be specifically tied to a particular computer architecture. The host CPU 105 has a bus interconnect 132 (e.g., PCI or PCIe (PCI-express) bus) to the route or network processors 104 and/or other components of the data-plane. PCIe can refer to PCI-X, PCI-express 16x, PCI-express 1x, and the like. Examples of other bus interconnect is the AGP (accelerated graphics port) bus. In some embodiments, the host CPU 105 and route/network processors 104 are co-located on a same supervisory card 114. In yet other embodiments, the host processor 105 is used as a substitute for, or integrated with, the route or network processor 104 or components thereof, e.g., in a network-on-a-chip (NoC). The bus interconnect 132 provides connectivity between the host CPU 105 and the data plane 136.

In FIG. 1, the route/network processors 104 is shown to connect to inline cards 112 through a switch fabric 106. Switch fabric may be embodied as a cross-bar switch configured to interconnect a plurality of serial channel port interfaces to establish point-to-point wire connections for switching frames among the line cards of the switch.

In FIG. 1, in some embodiments, the ports 102 are shown located on a plurality of in-line cards 112 (shown as 112a, 112b, 112c, and 112d) and the forwarding engine (i.e., route/network processor 104) is located on a supervisor card 114. Each in-line card 112 may include one or more ASIC(s) 116, memory and memory-like resources 118 (e.g., CAM, registers, buffers, and driver 120) to route a frame received at one of its port to another port or to route the frame to the switch fabric 106 to other ports in the network switch. Other configurations and implementations may be implemented.

An "ASIC" as used herein may refer to a customized application specific integrated circuit as well as configurable integrated circuit such as field-programmable gate array (FPGA) and complex programmable logic device (CPLD).

Broadly stated, when a frame (also referred to as a packet) is received at a port 102 at the line card, the frame is driven over an internal bus of the line card 112 based on forwarding decision rendered by the ASIC 116 (or local processor) located in the line card or is driven over the switch fabric 106 to other ports based on forwarding decision rendered by the forwarding engine. Such frames are processed by the data plane (also referred to as the forwarding plane, among other) of the network device. In FIG. 1, the data-plane 136 is shown as any component and associated resources involved in the forwarding and routing of user traffic. The data-plane (e.g., forwarding engine) renders the forwarding decision by accessing a forwarding table to look-up a destination MAC address of the frame. Frames associate with the control plane (e.g., those associated layer-2 and/or layer-3 control protocol such as Spanning Tree Protocol (STP), Open Shortest Path First (OSPF), Multiprotocol Label Switching (MPLS), Internet Group Management Protocol (IGMP), Intermediate System to Intermediate System (IS-IS), Border Gateway Protocol (BGP), PIM, Enhanced Interior Gateway Routing Protocol (EIGRP), Routing Information Protocol (RIP), virtual LAN (VLAN), Virtual Extensible LAN (VxLAN), etc.) and management plane (e.g., associated with telnet, command line interface (CLI), file transfer protocol (FTP), trivial file transfer protocol (TFTP), syslog, secure shell (SSH), simple network management protocol (SNMP), Hypertext Transfer Protocol (HTTP), HTTP Secure (HTTPS), access control lists (ACL), etc.) may also be received at the ports but are generally routed to the ASICs or to the route or network processor 104 to update control and management operation of the network device 100.

The network device 100 may include, as shown in FIG. 1, additional cards 122 comprising processors 124 and memory 126 to perform other control or supervisory operations of the network device 100. In some embodiments, the additional cards 122 (as well as in the supervisory card 114) may be implemented in general-purpose or special purpose computing devices environments, virtual network environment, or configurations. Components on the additional cards 122 may be connected to other components via the bus interconnect 132 or the switched fabric. The bus interconnect 132 also may allow the host CPU 105 to connect to the data-plane 136 via host CPU driver 134.

Computer-executable instructions, such as program modules, being executed by a computing device (e.g., via the host CPU) may be used. Generally, program modules include routines, programs, objects, components, data structures, etc. that perform particular tasks or implement particular abstract data types. Computer-executable instructions may execute the dynamic hardware resource protection module to be discussed below.

Distributed computing environments may be used where tasks are performed by remote processing devices that are linked through a communications network or other data transmission medium. In a distributed computing environment, program modules and other data may be located in both local and remote computer storage media including memory storage devices.

Computing device typically includes a variety of computer readable media. Computer readable media can be any available media that can be accessed by the device and includes both volatile and non-volatile media, removable and non-removable media. Computer readable media may be used to store executable instructions for dynamic hardware resource protection module to be discussed below. Computer storage media include volatile and non-volatile, and removable and non-removable media implemented in any method or technology for storage of information such as computer readable instructions, data structures, program modules or other data. Memory, removable storage, and non-removable storage are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information, and which can be accessed by computing device. Any such computer storage media may be part of computing device. Computer-executable instructions and computer storage media are well known in the art and are not discussed at length here.

Computing device may contain communication connection(s) that allow the device to communicate with other devices. Computing device may also have input device(s) such as a keyboard, mouse, pen, voice input device, touch input device, etc. Output device(s) such as a display, speakers, printer, etc. may also be included. All these devices are well known in the art and are not discussed at length here.

Dynamic Resource Shadowing for System Performance

Figure 2:
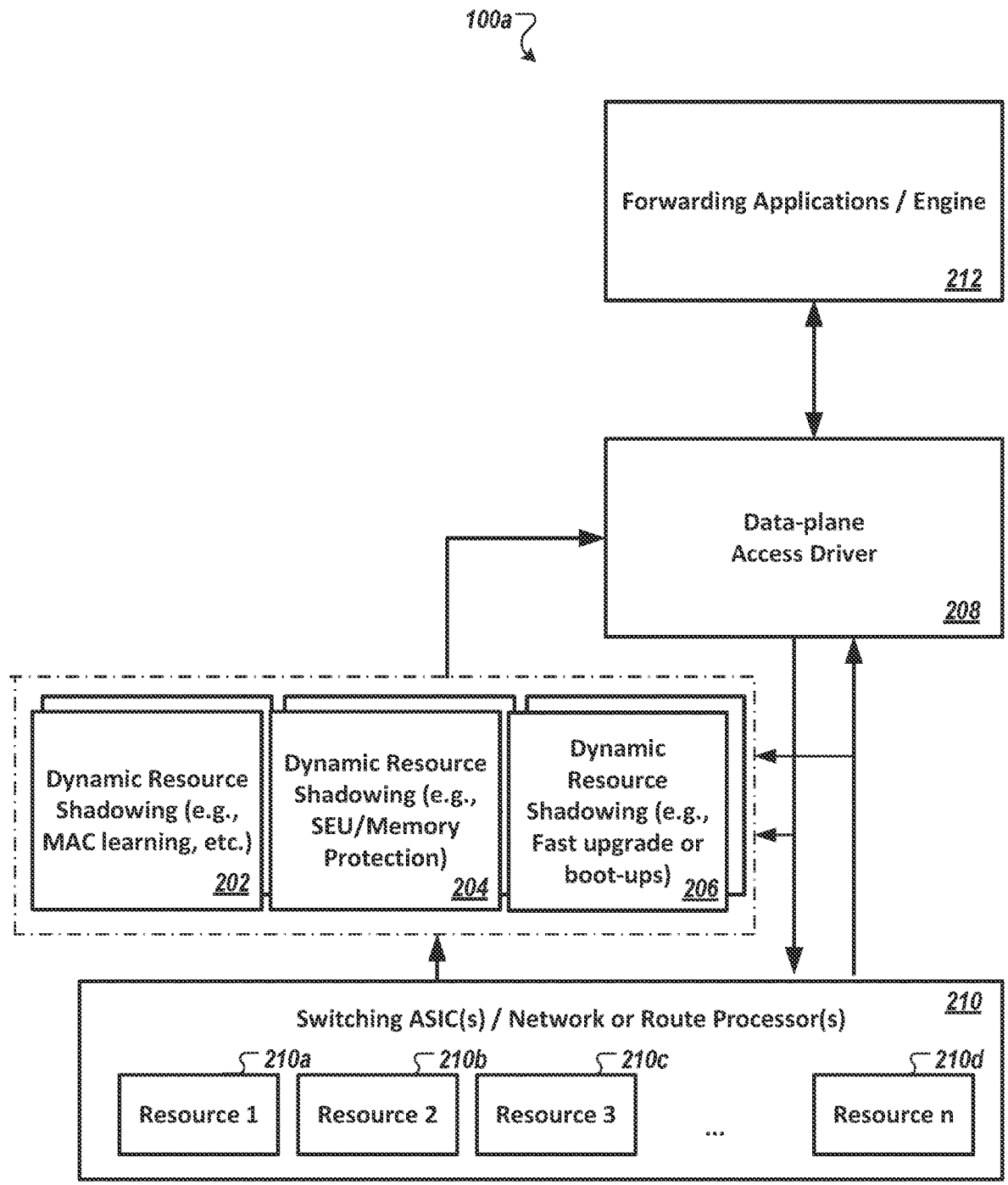
FIG. 2 is a diagram of a network device that can include one or more dynamic resource shadowing applications, in accordance with an illustrative embodiment.

FIG. 2 is a diagram of a network device 100 (shown as 100a) that can include one or more dynamic resource shadowing applications, in accordance with an illustrative embodiment. A module may include a software application, firmware, middleware, preconfigured logic function of configurable hardware (IP), or a combination thereof.

Dynamic resource shadowing module. In FIG. 2, the network device 100a comprises a dynamic resource shadowing module 202 (e.g., to improve system performance) configured to dynamically-shadow data-plane resources (e.g., memory, registers, CAM, TCAM, BCAM, etc.) that are managed by the host CPU. One or more instances of the dynamic resource shadowing module 202 may be implemented or instantiated.

In some embodiments, the shadowed resources (e.g., data-plane resource configuration) may be replicated and maintained synchronized to data-plane resources of data-plane device to allow the host-CPU to access the shadowed resources, when needed, thereby bypassing the need to fetching such resources from the data-plane through the bus interconnect. Indeed, dynamic resource shadowing module 202 may create shadowed copies of data-plane resources to improve system performance by reducing access latencies regardless of data-plane resource access patterns, size, sparsity, or distribution. In some embodiments, the dynamic resource shadowing module 202 may support shadowing of data plane instances having hundreds of megabytes of multi-gigabytes of information.

Referring to FIG. 2, the dynamic resource shadowing module 202, in some embodiments, is configured to monitor data-plane resource accesses as they pass between the data-plane access driver 208 and data-plane resources 210 (shown as 210a, 210b, 210c, and 210d) associated with a switching ASICs (e.g., 116) and/or route or network processor(s) (e.g., 104). The dynamic resource shadowing module 202 is configured to create and maintain a list of shadow copies of the data-plane resources.

The data-plane access driver 208 is responsible to provide access to the data-plane devices (e.g., NPU, Switching-ASIC), e.g., to a forwarding application and/or engine 212. When the data-plane access driver 208 is requested by a host CPU to perform a read access of a data-plane resource through the bus interconnect, the data-plane access driver is configured to first determine whether the data-plane resource associated with the request is shadowed, i.e., has a shadow copy. Indeed, in instances when the resource is indeed shadowed (i.e., a shadow hit), the data-plane access driver 208 accesses the shadow copy of the data-plane resource from host CPU local memory rather than fetching the data from the data-plane device (ASIC, RP, NPU, etc.) through the bus interconnect. This avoids the host CPU having to request a read of the data-plane resource from the bus interconnect.

As discussed above, read operations from the bus interconnect, i.e., PCI-express, though fast and have improved over time, have latencies typically around 1300 ns (for non-posted transactions). In contrast, similar read operations from standard local memory often used in networking equipment (i.e., DRAM) have latencies typically around 70 ns (almost a 20-fold difference as compared to PCIe). Faster classes of DRAM having lower latency read are available, in some instances approaching 20 ns. Indeed, a substantial benefit of dynamic resource shadowing module 202 to system improvement may be attributed to the leveraging of this asymmetry in associated latency of read access.

To avoid having to perform read access from the bus interconnect, the dynamic resource shadowing module 202, in some embodiments, is configured to generate a shadow copy of a given data-plane data resource via two mechanisms. In a first mechanism, the dynamic resource shadowing module 202 is configured to perform inline synchronization. In a second mechanism, the dynamic resource shadowing module 202 is configured to perform resource replay.

To perform inline synchronization, the dynamic resource shadowing module 202 is configured to first create a null structure of a given data plane resource. For example, where the data plane resource of interest is a table, the dynamic resource shadowing module 202 creates the table structure of that table, but initially fill entries in the table with a null or placeholder value, e.g., to distinguish if a given resource has data or is uninitialized. In some embodiments, the placeholder value comprise one or more bits. Initial null or placeholder values in a newly instantiated shadow copy may be classified, considered, and/or treated as a "shadow miss" for the purpose of triggering a read access of the corresponding data plane resource, though may not be profiled. Then, as read accesses are performed for a given data-plane resource instance, e.g., an entry in the table, the corresponding instance (e.g., entry in the table) in the shadow copy is updated with a read value. Inline synchronization thus gradually builds the shadow copy based on system activity. A read-access is still performed but subsequent read access of a same data-plane resource instance can be avoided by way of access from the host CPU shadow copy of the data-plane resource instance.

To perform resource replay, the dynamic resource shadowing module 202 is configured to re-execute and/or synchronize duplicate sets of data-plane resource (e.g., tables) in a shadow copy using information/data from a control-plane database. For example, routing tables and MPLS tables (as data-plane resources) are generated from control-plane data.

Indeed, the dynamic resource shadowing module 202, in some embodiments, is configured to maintain copies of frequently accessed data-plane resources in host CPU local memory, thus minimizing or avoiding accesses through slow interconnects, e.g., such as those discussed herein. Performance of the dynamic resource shadowing module 202, in some embodiments, are directly proportional to the number of shadowed hardware resources. The dynamic feature of the dynamic resource shadowing module 202 may be used to shadow, in CPU local memory, data-plane resources most likely to be requested by an application or process executing on the host CPU. The dynamic feature of the dynamic resource shadowing module 202 facilitates the efficient use of available shadow memory to meet the performance goals. The dynamic resource shadowing module 202 may be allocated a fixed or varying block of memory for resource shadowing.

The dynamic resource shadowing module 202, in some embodiment, is configured to maintain statistics of past read-access of a given data-plane resource of data-plane resource instance. In some embodiments, the dynamic resource shadowing module 202 is configured to create a shadow copy of a data-plane resource instance upon the resource instance having been accessed once or twice through the bus interconnect. In some embodiments, the dynamic resource shadowing module 202 is configured to create a shadow copy of a data-plane resource instance for a shadow copy of a data plane resource when read access of instances from the data plane resource meets a certain metric/policy.

In some embodiments, the dynamic resource shadowing module 202, in some embodiment, employs predictive model(s) of future/predicted usage patterns of data-plane resource and/or data-plane resource instance to shadow a given data-plane resource in host CPU local memory. The predictive models may be based on predictive analytics, predictive inference, statistical learning (machine learning), and/or statistical models.

As stated above, dynamic resource shadow operations have been shown to improve MAC address learning in certain classes of network switches from 1800 MAC addresses per second to 20,000 MAC addresses per second (a greater than ten-fold improvement in this application). Such benefits are mainly attributed to smaller latency time to perform a read access from host CPU local memory (e.g., about 70 ns for DRAM) than read access from bus interconnect such as PCIe (e.g., about 1300 ns for PCIe). Generally, MAC address learning can involve populating MAC address tables for use in the forwarding of traffic between ports in a given network device (e.g., switch), e.g., by linking source destination address of a given network node to an associated interface of the network device. In MAC learning application, upon receipt of the frame announcing the availability of a new network node at an ingress interface, an ASIC or some portion of the data-plane forwards the frame to the host CPU over the interconnect bus (e.g., 132) for processing by a MAC learning application executed at the host CPU, which then programs the forwarding tables (of the data plane) with the new route. In conventional forwarding applications, when the MAC learning application executing at the host CPU requires additional information of the data-plane resources (e.g., portion of the forwarding tables or other), the host CPU would fetch the required information from the data-plane device over the bus interconnect (e.g., 132).

Assume in an example, a MAC learning process/application executing at the host CPU invokes about 10 million read access from multiple data-plane resources of multiple data-plane devices over the bus interconnect. 10 million reads access at 1300 ns is approximately 13 seconds. Now, assume the same entries from 16 tables each having 64K entries are accessed through the bus interconnect; this is about 1 million unique read accesses of data-plane resource instances. Thus, inline synchronization can convert 9 million of read accesses from the bus interconnect to 9 million host CPU local memory read accesses. 9 million read access at 70 ns at read is approximately 60 ms—a 20× improvement in performing the same MAC learning task.

Dynamic resource shadow operations can be used for ARP (address resolution protocol) address learning, in a similar manner, among other processes that are managed by applications executing on the host CPU. Because MAC addresses and ARP addresses have age usefulness, often in the ten of minutes, such processes are continually running by the host CPU and thus any performance improvement to such processes can substantially reduce overall host CPU utilization. Similarly, any process or application executing on the host CPU that involves reading/fetching information from the data plane through the bus interconnect can similarly benefit from resource shadowing as described herein.

Indeed, as data-plane resources are increased in future network equipment, e.g., from 64K entries in a table to 128K, 256K, 512K, 1024K, 2048K, and, etc., dynamic resource shadow operations can greatly reduce the processing requirements of host CPU in such systems.

Figure 3:
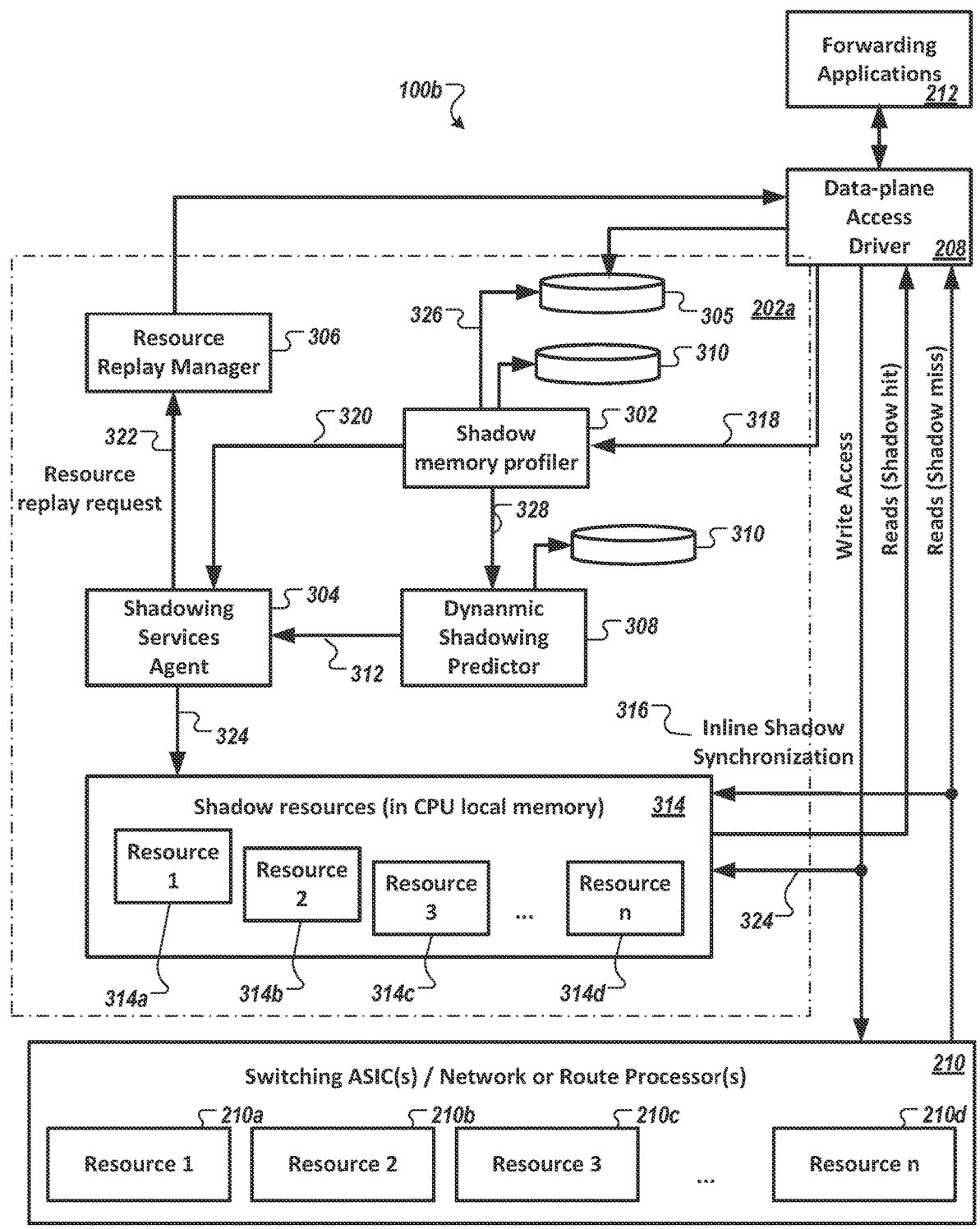
FIG. 3 shows a diagram of a system that includes a dynamic resource shadowing 202 in accordance with an illustrative embodiment.

FIG. 3 shows a diagram of a system 100 (shown as system 100b) that includes a dynamic resource shadowing module 202 (shown as dynamic resource shadowing module 202a) in accordance with an illustrative embodiment. Indeed, the dynamic resource shadowing module 202 may be implemented via instructions executing on host CPUs and other processing cores having access to bus interconnect with the data plane. In some embodiments, the dynamic resource shadowing module 202a) in accordance with an illustrative embodiment. Indeed, the dynamic resource shadowing module 202 may be implemented via instructions executing on cores of data plane devices such as NPUs and RP of various inline cards or supervisory cards as well as ASICs in which the NPU, RP, ASICs are connected to a bus interconnect to improve throughput of applications/processes executing there at to avoid read access from the bus interconnect.

Per FIG. 3, the dynamic resource shadowing module 202 is configured to dynamically-shadow data-plane resources for a forward application that is managed, in part, by a host CPU (e.g., 105) using data and information accessed from the data-plane through the bus interconnect. Per FIG. 3, in some embodiments, the dynamic resource shadowing module 202 includes a shadow memory profiler 302, a shadowing-services agent 304, a resource replay manager 306. In some embodiments, the dynamic resource shadowing module 202a further comprises a dynamic shadowing prediction module 308 configured to further optimize the system (in addition to 302, 304, and 306) by predicting the resources that will benefit from shadowing in the immediate future. Each sub-module (e.g., 302, 304, 306, 308) of the dynamic resource shadowing module 202a (as well as 202) may be implemented purely as computer readable instructions, purely in fixed or configurable combination logic, or a combination of both.

Shadow memory profiler. Shadow Memory Profiler implements policies and techniques to optimize the system operation and to decide which resources to shadow and which to discard. In some embodiments, the shadow memory profiler 302 is configured to track read accesses, made by data plane access driver via direction of the host CPU, of a data-plane resource (e.g., tables and such as described herein) through the bus interconnect and whether such read access has a corresponding shadow copy or not. When the data-plane resource has a shadow copy and read access is thus performed of the shadow copy from host CPU local memory; this is a "shadow hit". When the data-plane resource does not have a shadow copy and read access is performed through the bus interconnect; this is "shadow miss". A transaction request associated with a shadow hit can be 20× faster/less latency as compared to transaction request associated with a shadow miss, as discussed above in relation to lower latency operation of local memory read access as compared to PCIe read access.

The shadow memory profiler 302 is configured, in some embodiments, to track read accesses of data plane resources per individual data plane resource (e.g., specific tables), associated data plane device (e.g., ASIC/NPU/RP associated with a table), and associated inline card, among others. To this end, shadow memory profiler 302 is configured to direct shadow copies of data plane resources to be created for a specific data-plane resource, a group of data-plane resources associated with a give data-plane device, a group of data-plane resources associated with a system component (e.g., inline card).

When a pre-determined addition criterion is met, the shadow memory profiler 302, in some embodiments, is configured to send an add signal or message 320a (shown as 320) to the shadowing-services agent 304 to add the shadowed-missed resource to the system's list of shadow resources. In some embodiments, the add signal/message 320a includes one or more memory address(es) each associated with a memory block associated with the shadowed-missed resource. In other embodiments, the add signal/message 320a includes a range or a list of memory addresses associated with the shadowed-missed resource.

The shadow memory profiler 302, in some embodiments, is also configured to track the frequency of shadowed resource 314 (shown as 314a, 314b, 314c, and 314d) being accessed (i.e., shadow hits) and compare the shadowed hits count to a pre-determined criterion. In some embodiments, the shadowed-activity comparison is performed based on an inactivity timer. In other embodiments, the shadowed-activity comparison is performed based on a calculated resource utilization percentage. In other embodiments, the shadowed-activity comparison is performed based on a calculated percentage of access.

When a pre-determined removal criterion is met, the shadow memory profiler 302, in some embodiments, is configured to send a remove signal or message 320b (shown as 320) to the shadowing-services agent 304 to discard the under-utilized shadowed resource(s). In some embodiments, the remove signal/message 320b includes an identifier (e.g., an identification number associated with a given tracked shadowed resource) of the shadowed resource. In other embodiments, the remove signal/message 320b includes one or more memory address(es) each associated with a block of memory associated with the shadowed resource. In other embodiments, the remove signal/message 320b includes a range or a list of memory addresses associated with the shadowed resource.

As noted above, there are at least two mechanisms for shadow copy creation: inline synchronization and resource replay. Either mechanism, among others, can be used to populate an instantiated shadow copy of a specific data-plane resource, a group of data-plane resources associated with a give data-plane device, a group of data-plane resources associated with a system component (e.g., inline card). With inline synchronization, the structure of a data-plane resource is instantiated though filled with null or placeholder values or contents. The elements/units corresponding to a data-plane resource instance in an instantiated shadow copy are then filled in on an on-going gradual process as such data-plane resource instance are accessed by the data plane access driver from the data plane over the bus interconnect. When a shadow copy is created, it refers to structure of a data-plane resource being instantiated, e.g., in host CPU local memory, and having or all part of that structure being filled in with values and/or contents synchronized to the corresponding data plane resource.

Referring still to FIG. 3, in some embodiments, the shadow memory profiler 302 is configured to maintains a profile, e.g., a count, of shadow misses for a given resources and to compare the shadowed missed profile to a pre-determined criterion/ria. The tracked missed profile may be maintain in a database/counter of the host CPU memory 310 (or associated memory of a data plane device).

In some embodiments, the tracked missed profile includes a missed counter. In some embodiments, the missed-counter is compared to the pre-determined criterion/ria following an adjustment to the count value. In some embodiments, the missed-counter is compared to the pre-determined criterion/ria at predefined intervals or events. In some embodiments, the pre-determined criterion/ria is based on a pre-defined threshold (e.g., shadow-missed threshold value). In other embodiments, the missed-counter comparison is performed based on a calculated weighted moving average. In some embodiments, the missed-counter comparison is performed based on a calculated percentage of misses for a pre-defined set of access events.

Upon a criterion/ria being met, the shadow memory profiler 302 is configured to direct (320) the shadowing-services agent 304 to update (add or remove) a given shadow copy of a data plane resource. When directing the shadowing-services agent 304 to update (add or remove) a given shadow copy, the shadow memory profiler 302, in some embodiments, also updates, or directs the update of, (e.g., 326) the list of data plane resources and/or data plane resource instances to which a shadow copy exists (i.e., list of shadowed resources) (shown as databases 305).

The list of shadowed resources (e.g., in database 305) includes, in some embodiments, an address identifier of a data-plane resource instance, which may be associated with the address used for read-access and/or write-access of the data plane resources over the bus interconnect. For example, the list may include an address to a specific entry in a table (MAC address table, routing table, RIB table, and various data plane tables discussed herein). In some embodiments, the list of data plane resources includes a reference to a single set of entries in a table. In some embodiments, the list of data plane resources includes a range of address identifiers associated with a given data-plane resource. In some embodiments, the identifier is a uniquely generated number assigned to a given resource. In some embodiments, the identifier is a hash generated, in part, from the address identifier of a data-plane resource instance.

In some embodiments, the database 305 includes an address for the data plane resource instance in the shadow copy and an indication whether the shadow copy instance is synchronized/filled or merely instantiated, e.g., in the case of the shadow copy being created via inline synchronization. To this end, in some embodiments, the data-plane access driver 208 can update a shadow copy record directly by directing a write operation of an accessed data-plane resource instance determined to require a value and/or synchronization.

In FIG. 3, the database 305 comprising the list shadowed resources is shown connected to and maintained by the data-plane access driver. In other embodiments, as noted above, the database 305 comprising the list of shadowed resources is maintained by the shadow memory profiler 302 or some modules of the dynamic resource shadowing module 202a (not shown). In yet other embodiments, the database 305 comprising the list of shadowed resources is maintained in more than one list (not shown), e.g., where the shadowing services agent 304 maintains a global list of shadowed resources and the data-plane access driver 208 maintains a local list of data-plane resource instances needed by the shadowing services agent 304.

Data-plane access driver: The data-plane access driver 208 is responsible to provide access to the data-plane devices (e.g., NPU, Switching-ASIC). This is a known feature in network equipment and in the bus interconnect access. For PCIe bus interconnect, the data-plane access driver 208 includes hardware and software constructs configured to transact the PCIe bus interconnect to send or receive a Transaction Layer Packet (TLP). A read operation over PCIe comprises sending a TLP from the host CPU to the peripheral and then receiving a second TLP with the data from the peripheral (i.e., data-plane).

In some embodiments, the data-plane access driver 208 is further configured to maintain database 305 comprising the list of shadowed resources. The shadowing services agent 304 uses, in some embodiments, the database 305 to check whether a request for read access, e.g., by the host CPU, of a given data plane resource or data plane instance has an existing shadow copy. List of maintained resources may include data-plane associated resources and non-data-plane associated resources (e.g., control plane resource; system resources; resources associated with maintenance, management, and control of data-plane devices, resources associated with bootup and upgrade operation, etc.). List of shadowed resources may be dynamically and statically defined.

In some embodiments, the data-plane access driver 208 is further configured to write contents from a read access of the bus interconnect to a memory address of host CPU local memory (e.g., to fill in values and/or content of a data plane instance (e.g., entry in a table) in an instantiated shadow copy of a data plane resource (e.g., table)).

Shadowing Services Agent: The shadowing-services agent 304, in some embodiments, receives signaling and/or requests from the shadow memory profiler 302 to create, or delete, a shadow copy of a data plane resource. When creating a shadow copy, the shadowing-services agent 304 is configured to create an instance of a resource shadow (both control structures and storage for underlying data), and links them to the shadow framework (i.e., on-demand basis). The shadowing-services agent 304, in some embodiments, provides interfaces driven by shadow memory profiler 302 and the dynamic shadow prediction module 308.

As noted above, there are at least two mechanisms for shadow copy creation: inline synchronization and resource replay. For inline synchronization, in some embodiments, the shadowing-services agent 304 creates the storage space for the underlying data and directs the data-plane access driver 208 with a list of data-plane resource instances to populate the instantiated storage. For resource replay, the shadowing-services agent 304 creates the storage space for the underlying data and directs the resource replay manager 306 to populate the instantiated storage.

Resource Replay Manager: The resource replay manager 306 synchronizes a newly created/instantiated shadow resource with corresponding data-plane resources generated from configuration data in a control-plane database. In some embodiments, the resource replay manager 306 is configured to direct, or perform, the re-computation, for example, of routing table and forwarding information base, as data-plane resources to be stored in the newly created/instantiated shadow resource, from configuration data stored in control-plane databases. Configuration data in a control plane may include OSPF configuration data, EIGRP configuration data, BGP configuration data, STP configuration data, MPLS configuration data, IGMP configuration data, IS-IS configuration data, PIM configuration data, RIP configuration data, VLAN configuration data, VxLAN configuration data, ACL configuration data, e.g., to facilitate the discovery of adjacent devices and the overall network topology (or reachability information in case of distance/path vector protocols).

Figure 4:
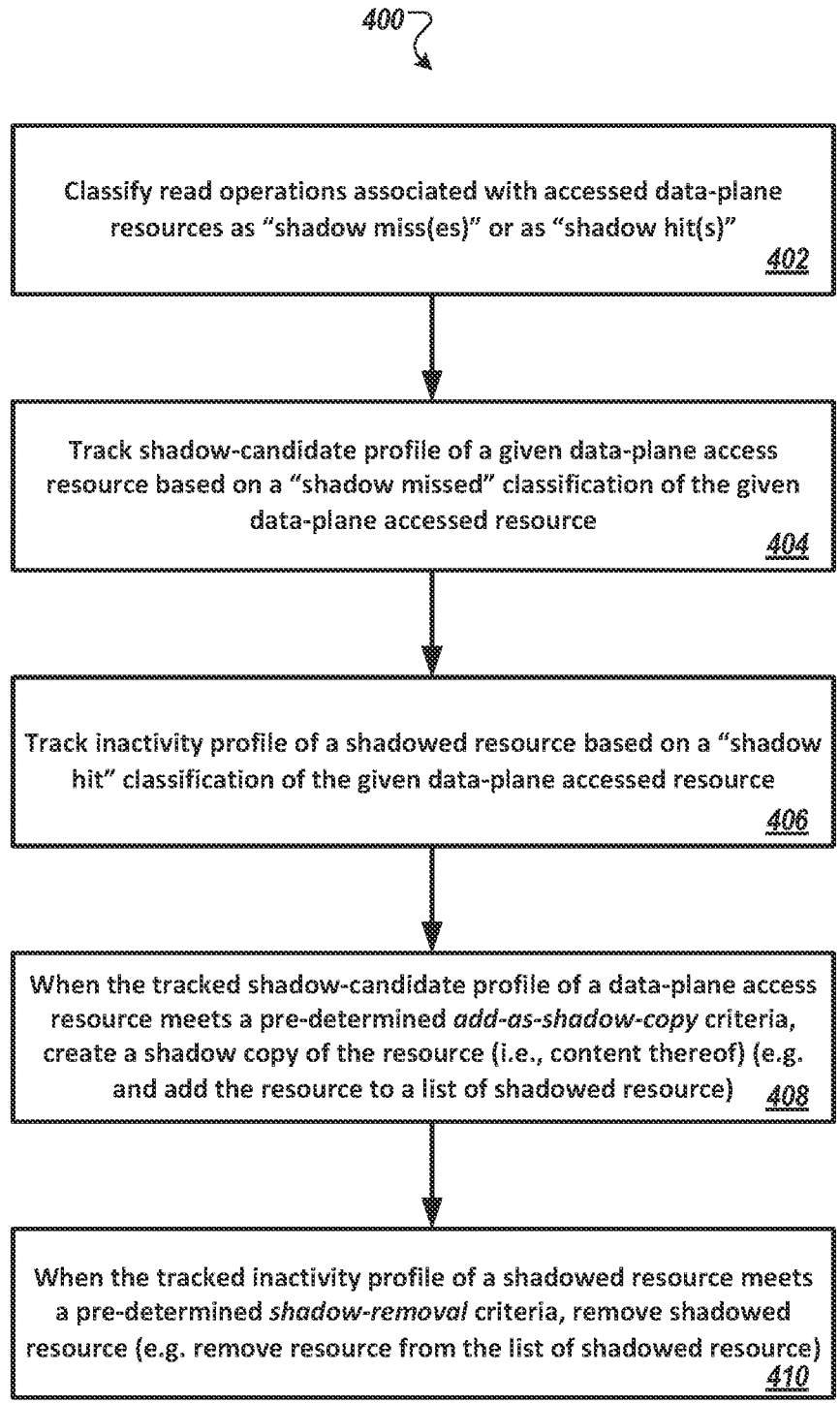
FIG. 4 is a flow diagram illustrating exemplary operations of the dynamic resource shadowing module of FIG. 3, in accordance with an illustrative embodiment.

FIG. 4 is a flow diagram illustrating exemplary operations 400 of the dynamic resource shadowing module 202a of FIG. 3, in accordance with an illustrative embodiment. As shown in FIG. 4, the method 400 includes classifying (402) read access operations associated with accessed data-plane resources, e.g., at the data-plane access driver 208 as a "shadow miss" or as a "shadow hit." The classifying operation (402) may be a part of each read access operation performed by data-plane access driver 208.

Figure 5:
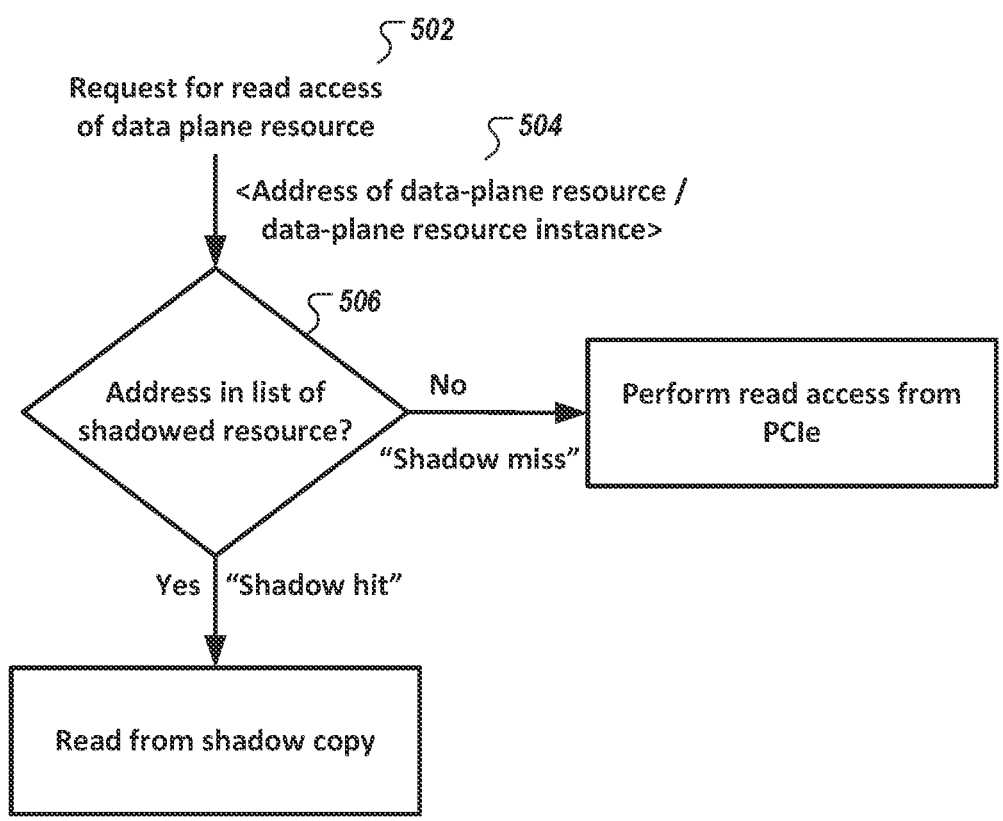
FIG. 5 is a flow diagram of an example read access operations in accordance with an illustrative embodiment.

FIG. 5 is a flow diagram of an example read access operations in accordance with an illustrative embodiment. In FIG. 5, a request for read access of a data plane resource is received (502) at a data-plane access driver 208, e.g., from an application or process executing on the host CPU. The request may include an address (504) of the data-plane resource (e.g., a table) or an instance in that data plane resource (e.g., one or more entries of the table). The data-plane access driver 208 may check the address (504) in the request against a list of addresses of shadowed resources. Upon a determination that the address exists in the list (i.e., shadowed hit), the data-plane access driver 208 then retrieves the content of the shadowed resource associated with the address.

FIG. 6 shows an example list 600 of shadowed resources, e.g., maintained by the data plane access driver (e.g., 208), in accordance with an illustrative embodiment. In FIG. 6, the address (e.g., 602) of a data plane resource is shown for a 64-bit index. The address (e.g., 602) of the data plane resource has a corresponding memory address (604) in host CPU local memory (e.g., 110), also shown having a 64-bit index. To this end, a request for read access for a given data plane resource can be directly mapped to a shadow copy of that data plane resource. The list 600 includes an identifier (e.g., shown as 606) that indicates whether the data/content of the host CPU local memory (i.e., shadow copy) is synchronized (e.g., shown as "in-line synchronized" 606) to a given data plane resource. The identifier (e.g., 606) may be 1-bit or more. When synchronized, the data-plane access driver 208 will read the content of the shadow copy based on the memory address (e.g., 604). When not synchronized, the data-plane access driver 208 will perform a read access of the data plane resource at memory address of the data plane resource (e.g., 602) to fulfill the read access request and then provide the retrieved information/data to populate the shadow copy at the corresponding memory address (e.g., 604). In some embodiments, the read and/or write access request includes <Resource-ID+Entry-ID>, which translates to an address. In some embodiments, the determination of whether a resource is shadowed is performed by interrogating an index of a table used to track the Resource-ID. Other addressing length and structure can be used without departing from the various use described in the instant disclosure.

As shown in FIG. 3, the forwarding applications 212 (e.g., layer-2 bridging) interface with the data-plane access driver 208 to control data-plane resources of the data plane. The data-plane access driver 208, in some embodiments, determines how to access the data-plane resources, including whether one or more "shadow hit" conditions are satisfied from the shadowed resource 314 for a given read operation and/or whether one or more "shadow miss" conditions are satisfied from the data-plane resource for a given read operation.

The data-plane access driver 208 may classify, determine, or treat, a resource shadowed having initial null or placeholder values (e.g., as instantiated in inline synchronization) as a "shadow miss" and thus performs a read access of the corresponding data plane resource after such determination.

Referring to FIG. 4, the method 400 includes tracking (404) shadow-candidate profile of a given data-plane accessed resource based on a "shadow missed" classification of the given data-plane accessed resource and tracking (406) inactivity profile of a shadowed resource based on a "shadow hit" classification of the given data-plane access resource.

The steps 404 and 406 may be performed concurrently with step 402. As shown in FIG. 3, the data-plane access driver 208, in some embodiments, is configured to provide the resource-access characteristics as input 318 (e.g., also considered as feedback) to the shadow memory profiler 302. The shadow memory profiler 302 implements and maintains policies and operations to optimize the system operation and determines resources to shadow and shadowed resource to discard based on the received resource-access characteristics. As discussed above, shadow memory profiler 302 may utilize one or more criteria, e.g., thresholds, read latencies, percentage of accesses, weighted moving averages etc. It also employs prediction models (e.g., maintained by the profiler 302 or an external source) of future usage patterns for the determination.

Referring still to FIG. 4, when a tracked shadow-candidate profile of a data-plane access resource meets a pre-determined criterion/ria (e.g., add-as-shadow-copy criteria), the method 400 includes creating (408) a shadow copy of the resource (i.e., content thereof) (e.g. and add the resource to a list of shadowed resource). As shown in FIG. 3, when a resource is identified by the shadow memory profiler 302 for shadowing, the shadow memory profiler 302 directs (320) the shadowing-services agent 304 to create and synchronize a shadow copy. At least two mechanisms have been discussed to create a shadow copy—namely, through replay/retrieval/download of the resource or through inline synchronization. Other mechanisms may also be implemented.

To replay/retrieve/download a resource, the shadowing-services agent 304, in some embodiments, is configured to send a resource replay request signal or message (322) to the resource replay manager 306. In some embodiments, the resource replay manager 306 is configured to then perform a replay of data plane resources from control plane configuration data by directing, or performing, the re-computation, for example, of routing table and forwarding information base (e.g., as data-plane resources) from configuration data stored in control-plane databases (comprising, e.g., OSPF configuration data, EIGRP configuration data, BGP configuration data, STP configuration data, MPLS configuration data, IGMP configuration data, IS-IS configuration data, PIM configuration data, RIP configuration data, VLAN configuration data, VxLAN configuration data, and/or ACL configuration data, etc.) Computing routing table and forwarding information base from configuration data from a control plane to the data plane is a common practice in the art. The difference herein is in being able to invoke such operation to populate an instantiated shadow copy in host CPU local memory.

To perform inline shadow synchronization, the shadowing-services agent 304 is configured to create storage space for the underlying data and directs the data-plane access driver 208 with a list of data-plane resource instances to populate the instantiated storage. In some embodiments, the first set of read access operations of a data plane resource entry may incur latency associated with "shadow miss" classification while subsequent reads may satisfy "shadow hit" classification and thus have lower latency. Indeed, inline shadow synchronization operation gradually builds the shadow resource 314 based on system activity.

Referring still to FIG. 4, when the tracked inactivity profile of a shadowed resource meets a pre-determined criterion/ria (e.g., a shadow-removal criteria), the method 400 includes removing (410) shadowed resource (e.g. remove resource from the list of shadowed resource). As shown in FIG. 3, the shadow memory profiler 302, in some embodiments, is configured to send a remove signal or message 320b (shown as 320) to the shadowing-services agent 304 to discard the under-utilized shadowed resource (s).

As noted above, in some embodiments, the dynamic resource shadowing module 202a further comprises a dynamic shadowing prediction module 308 configured to further optimize the system (in addition to 302, 304, and 306) by predicting the resources that will benefit from shadowing in the immediate future. As shown in FIG. 3, in some embodiments, the dynamic shadowing prediction module 308 is configured to receive, as inputs, classification of accessed data-plane resource from the shadow memory profiler 302. The dynamic shadowing prediction module 308 is configured to learn the resource usage patterns from the received inputs 328. Based on one or more generated models of the system (e.g., 100, 114, 112), dynamic shadowing prediction module 308 is configured to predict future usage patterns based on configuration, traffic, and applications in use.

In some embodiments, the dynamic shadowing prediction model provides inputs on what resources can benefit from shadowing. This information could have been learned over time and could be categorized as templates based on a customer's topology, running config, applications and services frequently used, etc.

It can be observed that a network system implemented with dynamic resource shadowing operation can have substantially lower update rates for key resources (in particular, for instance new routing table) as well significantly improved throughput of the interface to the hardware resources (as compared to comparable systems without this feature set or with the feature disabled). Further, it can be observed that dynamic resource shadowing operation can lower raw data-plane device access frequencies.

Dynamic Resource Shadowing of System Operations for MAC Learning

As noted above, dynamic resource shadowing operation can provide measurable benefits to system operation and has been observed to improve system performance. For example, in MAC learning operation for certain classes of network switches, dynamic resource shadowing operation has been observed to provide a 10× increase, e.g., from about 1800 MACs learned per second to over 20 k MACs learned per second.

Figure 7:
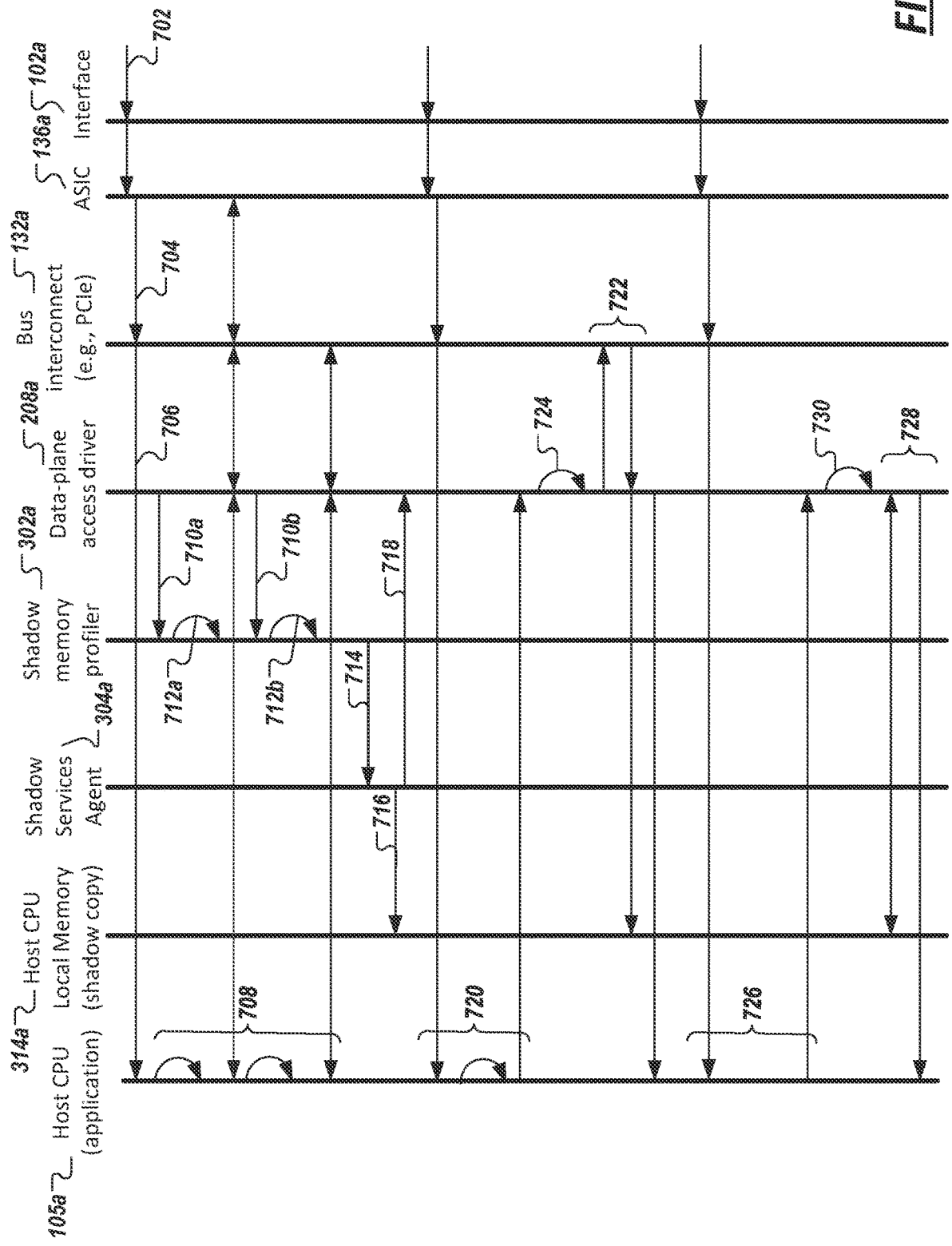
FIG. 7 shows a waterfall diagram of a dynamic resource shadowing operation that can benefit MAC learning operations in network equipment, in accordance with an illustrative embodiment.

FIG. 7 shows a waterfall diagram of a dynamic resource shadowing operation that can benefit MAC learning operations in network equipment, in accordance with an illustrative embodiment. In general, dynamic resource shadowing operation allows processes and/or application executing on a host CPU to avoid read access of data required by processes or application. Example of such processes and applications is MAC learning.

In FIG. 7, a frame 702 is received at a port 102 (shown as "Interface" 102a) of a network device. The data plane 136 (shown as "ASIC" 136a) of that port 102a forwards (704) the received frame through (706) a bus interconnect 132 (shown as "Bus Interconnect" 132a) to the host CPU 105 (shown as "Host CPU" 105a), which is managing a MAC learning application/process. Dynamic MAC address learning occurs when the bridging data path encounters an ingress frame whose source address is not present in the MAC address table for the ingress service instance. The host CPU may manage and/or direct (shown as processes 708) the distribution of learned MAC addresses to other cards with Ethernet Flow Points (EFPs) in the same bridge domain.

Upon the ASIC 136a forwarding (704) the frame through (706) the bus interconnect 132a to the host CPU 105 through the data-plane access driver 208a, the data-plane access driver 208a assesses whether data plane resource associated with the write operation has a shadow copy and reports a "shadow hit" or a "shadow hit" (shown as steps 710a, 710b) to a shadow memory profiler 302 (shown as "shadow memory profiler" 302a) of the determination.

Following several MAC learning process-related frames being transmitted through the bus interconnect 132a, the shadow memory profiler 302a determines (shown as 712a and 712b) the data-plane resource meets a criterion/ria for shadowing and directs (714) the shadow services agent 304 (shown as "shadow services agent" 304a) to create a shadow copy of the data-plane resource via inline synchronization.

The shadowing-services agent 304a, in performing the inline synchronization, creates (716) the storage space for the underlying data in host CPU local memory 314 (shown as 314a) and directs (718) the data-plane access driver 208a to add the addresses of the data-plane resource and the CPU local memory address to the list of shadow resources to populate the instantiated storage space. The shadowing-services agent 304a, in some embodiments, also provides an indication that instances in the shadow copy are not synchronized.

Inline synchronization operation can then gradually build the shadow resource 314a from data-plane device 136a based on system activity, e.g., with each subsequent read access from the data plane resource being used to populate a specific instance of the shadow resource. Once an instance of the shadow resource is synchronized (i.e., have a value in the shadow copy), the benefit of dynamic resource shadowing operation can be realized for each subsequent read access request of that dynamic resource as the read is performed from the host CPU local memory thus avoiding having to read access the data plane resource through the bus interconnect.

In FIG. 7, in subsequent MAC learning operations 720, when the host CPU 105a requests read access to a data plane resource being shadowed, in the first instance, the data-plane access driver 208a performs (722) a read access of the data plane resource (as it had determined 724 that the data plane resource was a "shadow missed"—in this case, having a shadow copy instance, but not synchronized). Then, in a second read access request (726) and any subsequent request to the data plane resource (e.g., per the data plane resource address), the data-plane access driver 208a performs (728) a read of the shadow copy in host CPU local memory (as it had determined 730 that the data plane resource was a "shadow HIT"—in this case, having a shadow copy instance and the instance being synchronized). Thus, the second read access and any subsequent request to the data plane resource avoids a read access of the data plane resource through the bus interconnect.

When tracked inactivity profile of the shadowed resource meets a pre-determined criterion/ria (e.g., a shadow-removal criteria), the shadow memory profiler 302a sends a remove signal or message to the shadowing-services agent 304a to discard the under-utilized shadowed resource(s) (not shown).

The example of FIG. 7 describes software-based MAC learning operations in which packets sent to the host-CPU via the bus interconnect. Indeed, dynamic resource shadowing operation may also be applied to hardware-based and hardware-assisted MAC learning, e.g., where the network processor or switching ASIC determines whether a source MAC address in an incoming packet is already present in a MAC table (e.g., filtering database). If the source MAC address is not present, then the hardware may add the address to its BCAM, in some embodiments. Once the hardware accumulates, e.g., N entries (e.g., 64, 128, etc.) of newly discovered MAC addresses, the hardware offloads (e.g., via DMA) the newly learnt MAC addresses to the host CPU memory (e.g., DRAM) and sends an indication to host CPU.

The host CPU can then act on the information and perform, in some embodiments, the adding of the newly learnt MAC addresses into the MAC table (e.g., filtering database). In such operation, in some embodiments, software application executing on the host CPU may look up other relevant information (e.g., input port-table, output port-table VLAN table, etc.) to add the correct information into the MAC table. In such embodiments, the system may create shadow copies of the other relevant information required by the host CPU (e.g., the input port-table, output port-table VLAN table, etc.). In some embodiments, the shadow copies may be generated during SDK initialization.

Dynamic resource shadowing operations, as described herein, can save read access over the bus interconnect during the lookup of such tables (e.g., input port-table, output port-table VLAN table, etc.). In relation to FIG. 7, the hardware assist operations for MAC learning can be referred in reference to operations 708, 720, 726, etc.

Indeed, system performance speedup may be directly proportional to the number of shadowed hardware resources. Dynamic resource shadowing operation as described herein may practically facilitate shadowing of key data-plane resource without having to shadow all data-plane resources, thus facilitating efficient use of available resource to meet the performance goals. Dynamic resource shadowing operation may create shadow of statically defined resources, e.g., based on anticipation of a given event, or based on system engineering understanding of resource usage.

In some embodiments, the resource shadowing mechanism can be used for ARP (address resolution protocol) address learning among other processes that are managed by applications executing on the host CPU. Because MAC addresses and ARP addresses have age usefulness, often in the ten of minutes, such processes are continually running by the host CPU and thus any performance improvement to such processes can substantially reduce overall host CPU utilization. Similarly, any process or application executing on the host CPU that involves reading/fetching information from the data plane through the bus interconnect can similarly benefit from resource shadowing as described herein.
Dynamic Resource Shadowing for Single Event Upset and Memory Protection In another aspect, a framework for an infrastructure is disclosed that leverages the dynamic shadow framework to provide shadow copies of data plane resources for SEU and memory protection. FIG. 2 further shows a network device 100 (e.g., shown as 100a) comprising a SEU/Memory protection module 204 configured to dynamically resource-shadow data-plane resources of the network device 100 for SEU or memory protection, in accordance with an illustrative embodiment. In addition to improving system performance (e.g., as discussed in relation to the dynamic resource shadowing module 202), SEU/Memory protection module 204 employs dynamically resource-shadowing to protect hardware/memory resources against SEU failures and various memory errors including hardware/memory resources in the data plane and in the system.

Examples of protectable resources include, but are not limited to, various addressable memory and other volatile storage, including, but not limited to, RAM, DRAM, SRAM, BCAM, TCAM, register files, etc. of data plane resources (e.g., discussed in relation to 108, 110, 118, 126). In some embodiments, the protectable resources may be located, or associated with, addressable resources located in individual inline cards (e.g., 112), addressable resources in ASICs (e.g., 116), addressable resources of network processor(s) 104, addressable resources of supervisory card(s) 114, and addressable resources of cards 122 located in the network device (e.g., 100, 100a, 100b, 100c, 100d, etc.).

As discussed above, SEU error changes the value of stored data, resulting in unexpected system behavior (e.g., unexplained errors, random system crashes, security issues). SEU errors are often attributed to ionizing particle (ions, electrons, photons, etc.) impacting a sensitive node in a micro-electronic device (i.e., hardware of data-plane resource). Elevated solar activity often produces greater emission of ionizing particles that can cause SEU error. In addition, SEU errors can be attributed to aging hardware, improper or insufficient thermal management/cooling, and signal noise and interference. Though random, SEU error tends to occur in spurts to a given set of data-plane devices and system components and nearby components. Left unchecked, multiple SEU errors to data-plane resources can threaten system integrity.

To maintain system cost at competitive levels, most data-plane devices have protections only for critical hardware resources and such protection mostly provides for the detection and correction of single-bit errors. Non-critical hardware resources may have error detection support (e.g., multi-bit or parity protection support) and no error correction capabilities, and some hardware resources may have no protection at all. Dynamic resource shadow operations may be used in conjunction with existing data-plane devices error detection and correction, or may be used to optimize such data-plane devices error detection and correction framework, to extend the detection and correction protection to a substantial set of, or all, data plane hardware as well as system resources and hardware.

Firstly, dynamic resource shadow operations can be used to generate shadow copies of data plane resources that can then be used to correct errors that subsequently occurs in such resources.

In addition, dynamic resource shadow operations may use tracked patterns of SEU errors and various errors, particularly with respect to specific data-plane devices. Because errors tend to appear more frequently at the same hardware, though at random locations in memory of that hardware, dynamic resource shadow operations can direct creation of shadow copies of hardware determined most prone to errors. Once created, the shadow copies can be used to correct any errors detected in such hardware.

Further, in being able to vary and re-allocate resource shadow dynamically, in some embodiments, protection as provided by the dynamic resource shadow operations can be varied, e.g., based on available system resources and workload.

Further, once created, shadow copies can be used to detect errors in hardware having no or limited error detection. This provides a new capability of protection not available in network equipment, which can provide significant hardware design and manufacturing cost savings. And, of course, once detected, the same shadow copies of resources can be used to correct the errors in such resources.

Because shadow resources can be implemented on less specialized hardware (e.g., as part of host CPU local memory) as compared to specialized hardware used in the data plane, in some embodiments, all critical data plane resources can be shadowed and thus made correctable (e.g., 4-8 GB of DRAM is common while similar size storage in CAM, or TCAM could be quite costly). As noted above, dynamic resource shadow operations can create static list of pre-defined data-plane resources.

In a further embodiment, dynamic resource shadow operations may be used with an adaptive memory scrubbing operation, also disclosed herein. The adaptive memory scrubbing operation can provide multiple tiers of memory protection, including scheduled memory scrubbing and on-demand scrubbing with inputs, e.g., from the dynamic resource shadow operations.

Figure 8:
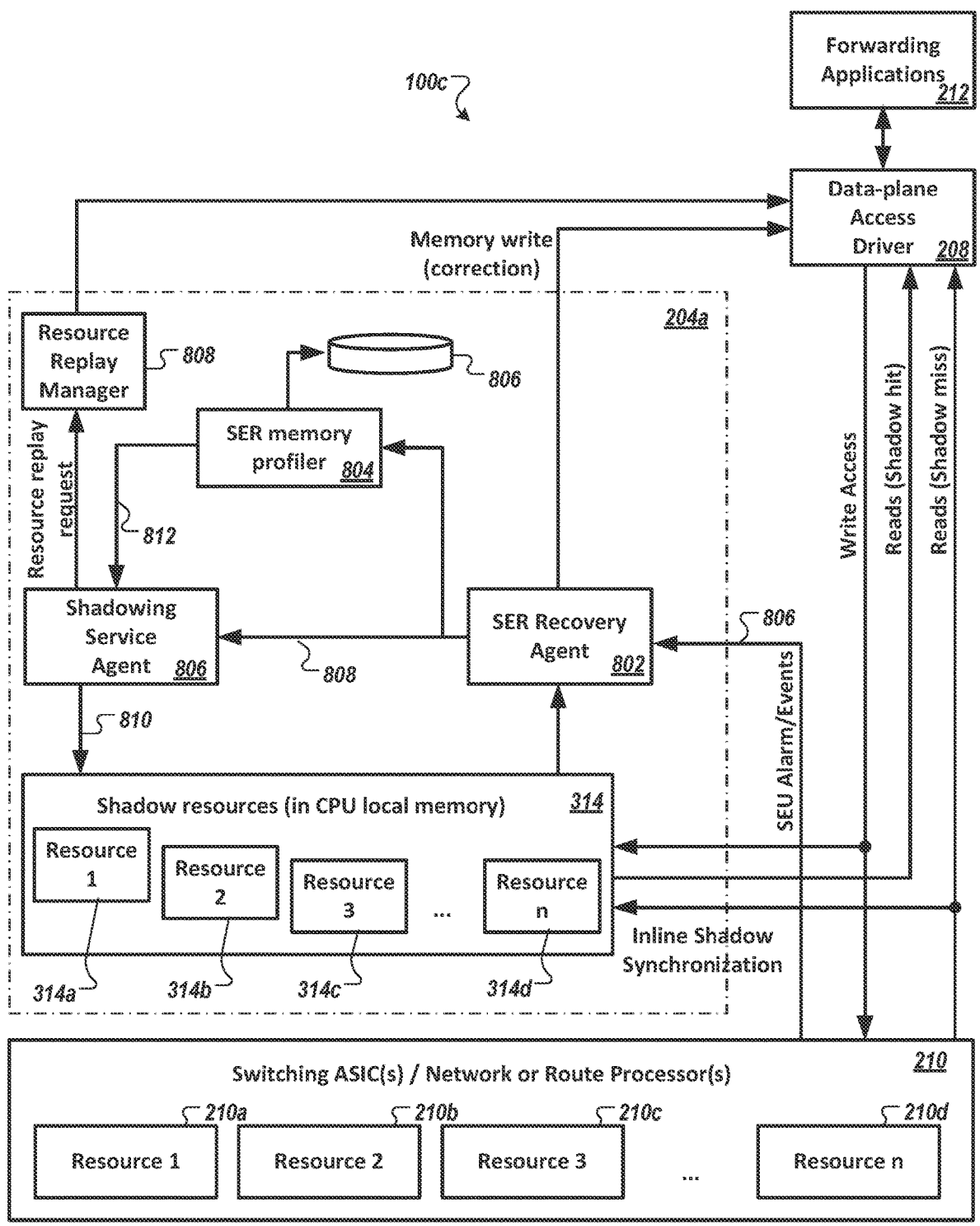
FIG. 8 is diagram of a network device comprising a SEU/Memory protection module, in accordance with an illustrative embodiment.

Indeed, implementations of embodiments of the SEU/Memory protection module 204 can improve reliability and uptime of network device components (e.g., 112, 114, 122) as well as of the network device (e.g., 100, 100a, 100b).
Example SEU/Memory Protection Module FIG. 8 is diagram of a network device 100 (shown as 100c) comprising a SEU/Memory protection module 204 (shown as 204a), in accordance with an illustrative embodiment. In FIG. 8, the SEU/Memory protection module 204a includes a SER recovery agent 802, a SER memory profiler 804, a SER shadowing services agent 806, and a SER resource replay manager 808. Though generally described herein as separate components, it should be understood that the SER shadowing services agent (e.g., 806) may be implemented as part of the shadowing services agent 304, e.g., used for system optimization. That is, the same shadowing services agent (e.g., 304 or 806) may be used for system optimization and for memory protection, among other applications disclosed and/or not disclosed herein. Similarly, though generally described herein as separate components, it should be understood that the SER resource replay manager (e.g., 808) may be implemented as part of the resource replay manager 306, e.g., used to system optimization and thus can be used for system optimization, memory protection, among other applications disclosed and/or not disclosed herein.

SER recovery agent. SER recovery agent 802 is configured to receive SEU alarms and events, e.g., through interrupts and polling mechanism, associated with error to a resource. When the error alarm/event includes an identifier or address to a specific data-plane resource instance (e.g., entry of a table), the SER recovery agent determines whether the data-plane resource instance (e.g., entry) or the associated data-plane resource (e.g., table) is being shadowed. When the error alarm/event does not include an identifier or address of the erred data-plane resource, the SER recovery agent may correlate to received error to an affected data-plane resource (e.g., table). From the determination, if the data-plane resource is being shadowed, the SER recovery agent 802 is configured to retrieve the data/information from the shadow copy and write the resource to correct the error. If the data-plane resource is not shadowed, the SER recovery agent 802 may direct the SER shadowing services agent 806 to immediately create a shadow copy of the erred data-plane resource and may attempt to correct the error, e.g., by trying to recover/regenerate the correct value and writes the resource (e.g., recompute the data plane resource from a control plane database) or direct EDAC modules of the data plane to perform a correction.

Because SEU errors tend to occur in spurts, the created shadow copy may be instantiated and populated immediately.

Where the error is not correctable, the SER recovery agent 802 may report the error and/or prompt the operator to restart the system. The SER recovery agent 802 also notifies the SER memory profiler 804 of the error and any corrective action performed.

SER memory profiler. SER memory profiler 804 is configured to collect data on memory errors of data plane resources per individual data plane resource (e.g., specific tables), associated data plane device (e.g., ASIC/NPU/RP associated with a table), and associated inline card, among others. In some embodiments, the SER memory profiler 804 also collects, for logging purposes (e.g., in database 806), recovery attempts, actions, frequency of errors, and the corresponding hardware resource. In some embodiments, the SER memory profiler 804 may directly use the collected data to identify a given data plane resource (e.g., table) or hardware component (e.g., inline card, etc.) to shadow. To this end, SER memory profiler 802 is configured to direct shadow copies of data plane resources to be created for a specific data-plane resource, a group of data-plane resources associated with a give data-plane device, a group of data-plane resources associated with a system component (e.g., inline card). Indeed, the SER memory profiler 802 may proactively create new shadow copies of data-plane resources and discard existing shadow copies. Changes are notified to the Shadowing Services agent.

In some embodiments, when a pre-determined criterion is met, the SER memory profiler 802 is configured to send an add/remove signal or message 812 to the SER shadowing services agent 806 to create or remove a shadow copy of a given data-plane resource. In some embodiments, an add signal/message (e.g., 812) includes one or more address(es) each associated with a block or instance (e.g., entry) of the data-plane resource.

The SER memory profiler 802, in some embodiments, is also configured to track the frequency that a shadow copy of a given data-plane resource is accessed and to remove the shadow copy based on an inactivity timer. In other embodiments, the SER memory profiler 802 may calculate a percentage of resource utilization and using the calculation to trigger a shadow copy remove operation.

SER Shadowing Services Agent. The SER shadowing services agent 806 is configured to receive signaling and/or requests from the SER recovery agent 802 or SER memory profiler 804 to create a shadow copy of a data plane resource.

The SER shadowing services agent 806 may receive requests from the SER memory profiler 804 to remove a shadow copy created for memory protection. When creating a shadow copy, the SER shadowing services agent 806 is configured to create an instance of a resource shadow (both control structures and storage for underlying data) and direct the resource replay manager 808 to populate the instantiated storage. The SER shadowing services agent 806, in some embodiments, provides interfaces driven by SER recovery agent 802 and the SER memory profiler 804.

Resource Replay Manager. The SER resource replay manager 808 is configured to synchronize a newly created/instantiated shadow resource with corresponding data-plane resources generated from configuration data in a control-plane database. For example, the SER resource replay manager 808 may direct, or perform, the re-computation of routing tables and forwarding information base from configuration data stored in control-plane databases. Configuration data in a control plane may include OSPF configuration data, EIGRP configuration data, BGP configuration data, STP configuration data, MPLS configuration data, IGMP configuration data, IS-IS configuration data, PIM configuration data, RIP configuration data, VLAN configuration data, VxLAN configuration data, ACL configuration data, e.g., to facilitate the discovery of adjacent devices and the overall network topology (or reachability information in case of distance/path vector protocols).

Example Operation of SER Memory Protection

Figure 9:
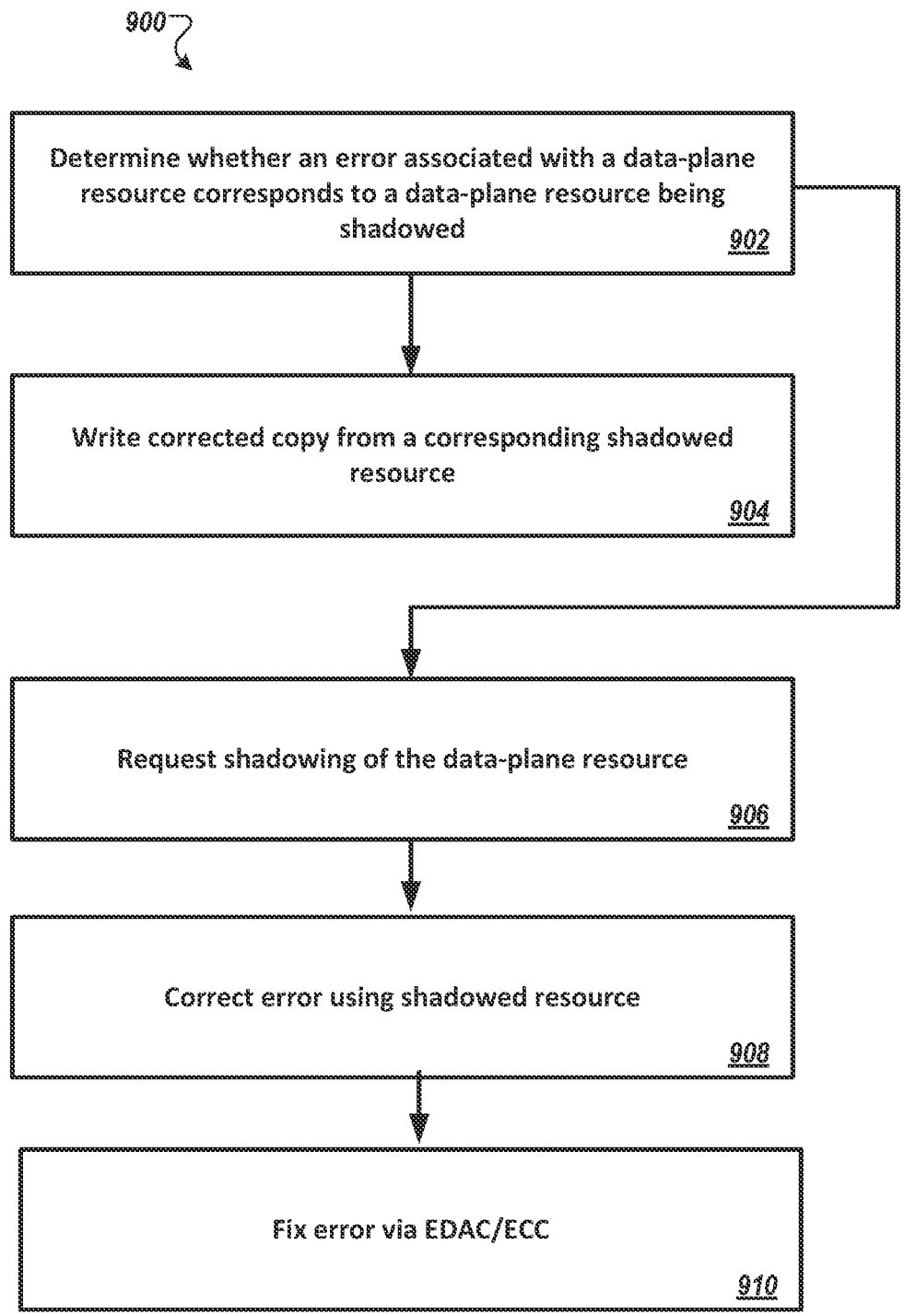
FIG. 9 is a flow diagram illustrating exemplary operations of the SEU/Memory protection module of FIG. 8, in accordance with an illustrative embodiment.

FIG. 9 is a flow diagram illustrating exemplary operations 900 of the SEU/Memory protection module of FIG. 8, in accordance with an illustrative embodiment. In FIG. 9, the method 900 includes determining (902), e.g., by SER recovery agent 902, whether a data-plane resource affected by the received error is shadowed in shadow memory. If the data-plane resource is shadowed, then the system (e.g., SER recovery agent) is configured to write (904) from the shadowed resources to the data-plane resource to resolve the error. If the data-plane resource is not shadowed, then the system (e.g., SER recovery agent) is configured to request (906) shadowing of the data-plane resource, e.g., from the shadowing-services agent (e.g., via a replay operation). As discussed above, to perform the replay operation, the SER resource replay manager 808 may direct, or perform, the re-computation of routing tables and forwarding information base from configuration data stored in control-plane databases. If not recoverable, the system may rely on EDAC/ECC correction modules of the data-plane.

To reduce risks of errors occurring in the specific data-plane resource, shadowing-services agent in some embodiments is configured to further write (e.g., as part of step 904 or in a separate step (not shown)), in addition to a specific data-plane resource instance (e.g., an entry of a table), to the entire data-plane resource (e.g., to an entire table). Because SEU error, though random, tends to occur in spurts to a given set of data-plane devices and system components and nearby components, such operation may correct errors that have not been, or yet been, detected. In some embodiments, all data-plane resources of a component (e.g., inline card) are corrected. In some embodiments, all data-plane resources (e.g., all tables) associated with a data-plane device (e.g., ASIC) are corrected.

Example Operation of Profiling for SEU Memory Protection

Figure 10:
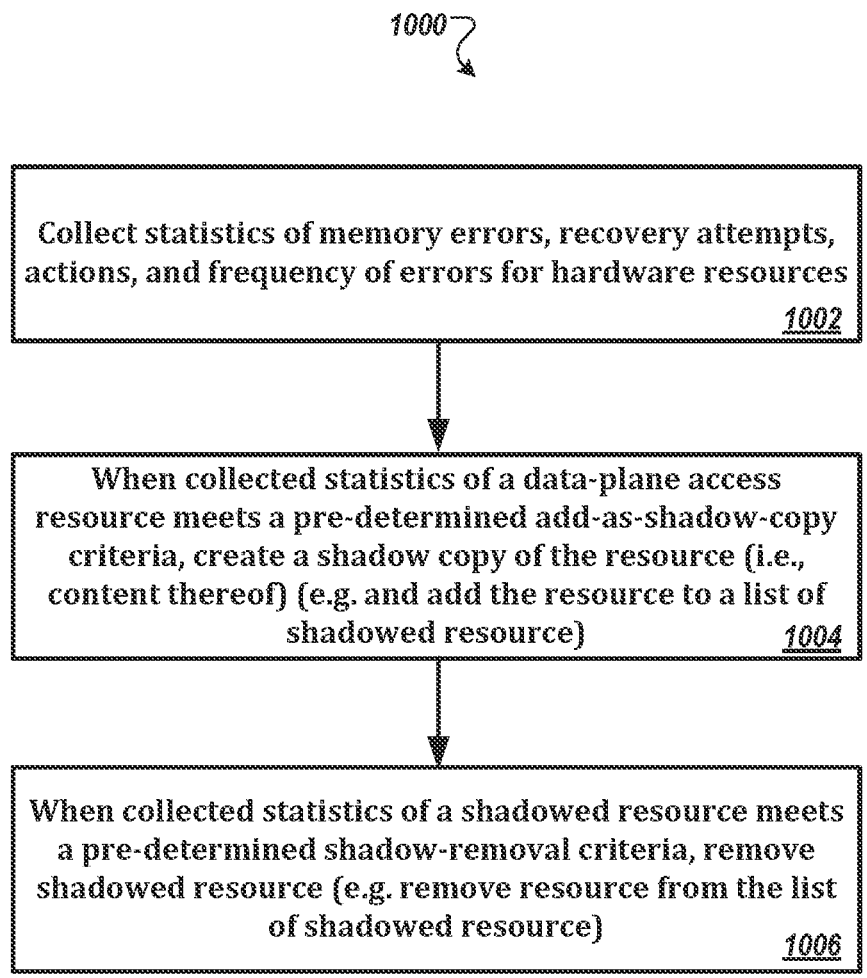
FIG. 10 is a flow diagram illustrating exemplary operations of the SEU/Memory protection module of FIG. 8, in accordance with another illustrative embodiment.

FIG. 10 is a flow diagram illustrating exemplary operations 800 of the SEU/Memory protection module 204a of FIG. 8, in accordance with another illustrative embodiment.

In FIG. 10, the method 1000 includes collecting (step 1002) statistics of memory errors, recovery attempts, actions, and frequency of errors for data plane resources and/or various hardware resources. In some embodiments, the operation is performed by the SER profiler 802. The collected statistics, in some embodiments, is used for analysis to determine data-plane resources and/or hardware resources to be shadowed. In some embodiments, the collected statistics are aggregated in a log report, which is off-loaded for analysis, e.g., to determine whether specific data-plane resources and/or hardware resources are prone to SEU or various memory errors.

In some embodiments, the analysis performed by the SER profiler 602, which may gather addresses or identifier of specific data-plane resources (e.g., TCAM, CAM, etc., for a specific ASIC, NP, or RP) in a list of erred resources. Based on frequency and/or distribution of SEU errors or various errors being detected with a given inline card, ASIC, NP/RP, etc., the SER profiler 602, in some embodiments, is configured to flag the data-plane resources, the data-plane device, or the associated hardware component, for shadowing. When a data plane resource is flagged for shadowing, SER profiler 602 may send a request to the SER shadowing services agent. The request includes, in some embodiments, one or more addresses or identifier associated with a given data plane resource instance. In other embodiments, the request includes one or more addresses or identifier associated with the data plane resource (i.e., addresses or identifier associated with other instances in the data-plane resource). In yet other embodiments, the request includes addresses or identifier associated with all data plane resource instances (e.g., all entries of a table) of a given data plane resource (e.g., table). In yet other embodiments, the request includes addresses or identifier associated with all data plane resource instances (e.g., all entries of a table) associated with a data-plane device (e.g., ASIC, network processor, route processor, etc.). In yet other embodiments, the request includes addresses or identifier associated with all data plane resource instances of a given system component resource (e.g., all tables maintained on a given inline card).

FIG. 11 shows an example database 1100 maintained by a SER profiler 602 of FIG. 8, in accordance with an illustrative embodiment. In FIG. 11, the database 1100 includes a mapping of data plane resource memory addresses (shown in column 1102) to a given data plane device (shown in column 1104). The database 1100 may include resource memory mapping to a system component (shown in column 1106). The database 1100 may include a counter of error hits for a given data plane memory address.

In some embodiments, the database 1100 include a separate counter for a given data plane device (e.g., ASIC, network processor, route processor, etc.) (e.g., column 1104) or a given system component (e.g., inline card) (e.g., column 1106). The counters may have a 16-bit, 24-bit, or 32-bit value, among others.

In FIG. 11, the data plane resource device (1104) is shown with a 32-bit identifier and the corresponding system component is shown with a 16-bit identifier. The data-plane resource memory addresses are shown with a 24-bit address for tables having about 4K or 124K entries. Of course, other address values and table sizes may be applicable according to the specific device and implementation.

Referring to FIG. 10, the method 1000 includes removing (1006) a shadowed resource (e.g., remove resource from the list of shadowed resource) when collected statistics, e.g., distribution of collected SEU error, of a shadowed resource meets a pre-determined criterion (e.g., pre-determined shadow-removal criteria). In some embodiments, the distribution threshold is fixed (e.g., less than a pre-defined percentage, say 1%, of received SEU errors are associated with a given data-plane resource). In some embodiments, the distribution threshold is variable, e.g., being based on the available system resource allocated to use for shadowing. In some embodiments, the pre-determined criteria may be defined by periods of days, week, or months. In some embodiments, shadowed resource of a hardware resources are automatically removed when hardware resource is decommissioned or temporarily removed by the system administrator.

Examples Operations for SER Memory Protection

Figure 12:
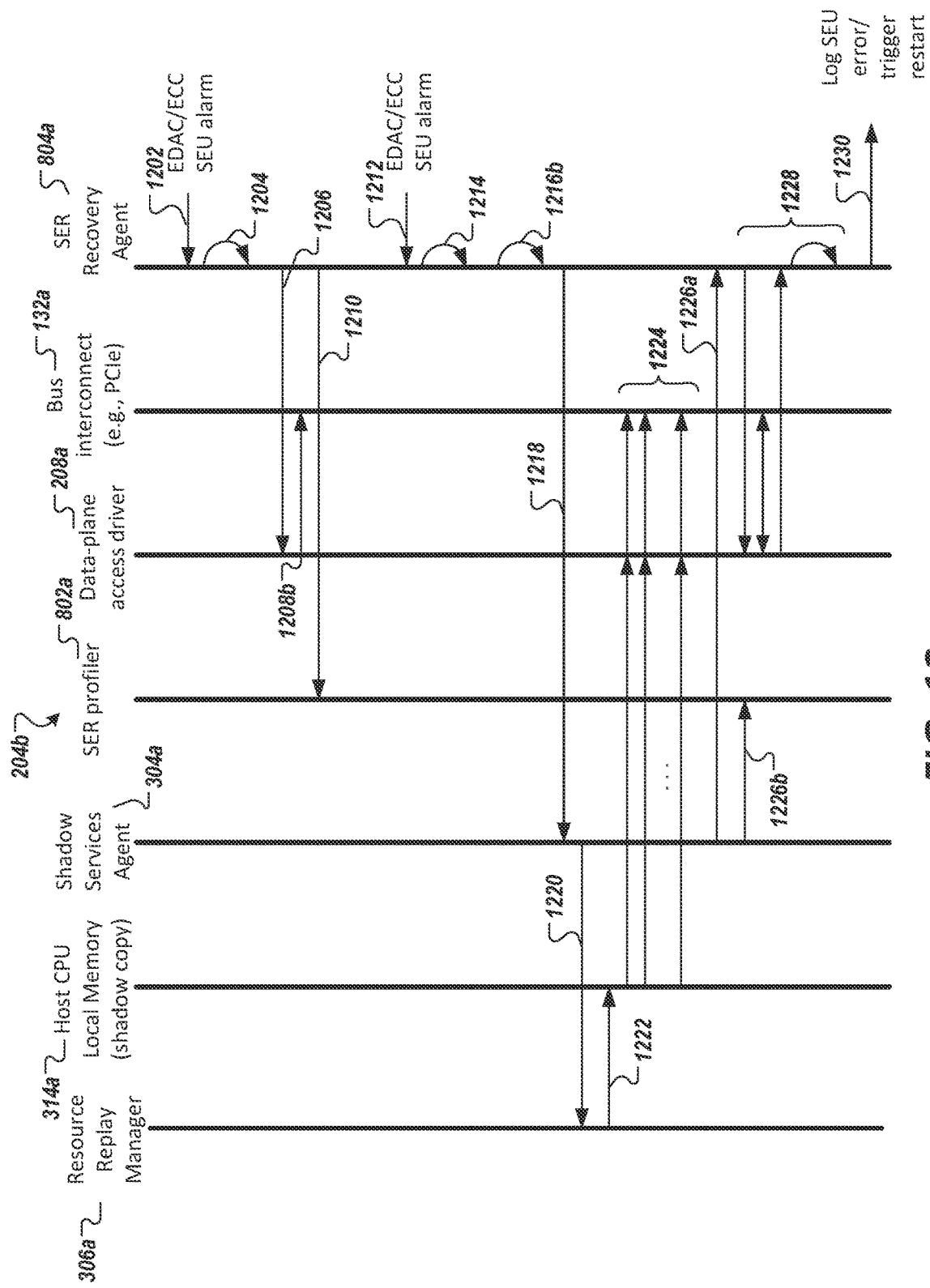
FIG. 12 shows a waterflow diagram of operations by a dynamic resource shadowing module that can facilitate SER memory protection, in accordance with an illustrative embodiment.

FIG. 12 shows a waterflow diagram of operations by a dynamic resource shadowing module 204 (shown as 204*b*) that can facilitate SER memory protection, in accordance with an illustrative embodiment.

In the example of SER (soft error rate) protection, in FIG. 12, a SER recovery agent 804 (shown as 804*a*) receives a SEU error notification (shown as 1202) reported by the data-plane 136, e.g., from an EDAC/ECC module or function located within the data plane. In some embodiments, the SER recovery agent 804*a* correlates (1204) the received error to an affected data-plane resource to identify a set of addresses associated with the affected data-plane resource. In some embodiments, the SEU error notification 1202 includes an associated system device identifier, an associated data-plane device identifier, and/or an associated data-plane resource memory address or identifier. From the notification, the SER recovery agent 804*a* assesses (also 1204) whether the affected resource is shadowed, i.e., whether a shadow copy exists of that affected resource. In some embodiments, the SER recovery agent 804*a* maintains a list of shadowed resources, e.g., as shown as discussed in relation to FIG. 6. In other embodiments, the list of shadowed resources is maintained in a separate database, e.g., maintained by the SER shadowing services agent 806 or by the data-plane access driver (208*a*).

In some embodiments, where the SER recovery agent 804*a* receives specific addresses of data-plane resource (e.g., addresses corresponding to an entry in a table) having the associated SEU error, the SER recovery agent 804*a* may direct a correction of addresses or identifiers associated with the data-plane resource (e.g., entries in the table).

In some embodiments, the SER recovery agent 804*a* direct rewrite of addresses nearby to that affected address, e.g., the entire data-plane resource (e.g., table).

In FIG. 12, as discussed above, when the resource is determined to be shadowed, the SER recovery agent 804*a* is configured, in some embodiments, to direct or trigger one or more write operation(s) to correct the error. As shown in FIG. 12, in some embodiments, the SER recovery agent 804*a* retrieves (1206), from host CPU local memory 314*a*, shadowed data corresponding to the set of addresses associated with the affected data-plane resource and then directs (shown as 1208*a*, 1208*b*) the correction to the relevant data-plane resource through the bus interconnect 132*a* via the data-plane access driver 208*a*. In other embodiments, the SER recovery agent 804*a* directs (not shown) the shadow service agent 304*a* to coordinate the correction.

In FIG. 12, when the resource is determined not to be shadowed, the SER recovery agent 804*a* is configured to attempt to regenerate the corrected value and writes the corrected value to the resource. In FIG. 12, this is demonstrated via receipt of a second error 1212. Here, the SER recovery agent 804*a* correlates (1214) the received error to an affected data-plane resource to identify a set of addresses associated with the affected data-plane resource and assesses whether the affected resource is shadowed, i.e., whether a shadow copy exists of that affected resource (e.g., with the list of shadowed resources).

Upon a determination that the affected address is not shadowed, the SER recovery agent 804*a* attempts to regenerate the corrected value and writes the corrected value to the resource. In some embodiments, the SER recovery agent 804*a* signals or directs (1220) the shadow services agent 304*a* to create a shadow copy of that data-plane resource (e.g., via a replay operation). In FIG. 12, the shadow services agent 304*a* signals (1220) the resource replay manager 306*a* to obtain (1222) configuration data from control-plane databases to populate a new shadow copy, e.g., in the host CPU local memory 314*a*. The shadow copy in memory 314*a* are then synchronized (shown as 1224) to the data-plane resource over the bus interconnect 132*a*. When the synchronization 1224 is complete, the SER shadowing services agent 304*a* informs (shown as 1226*a* and 1226*b*) the SER recovery agent 804*a* and the SER memory profiler 802*a* of the fix.

When the attempted synchronization 1224 does not fix the SEU error, or the SER recovery agent 804*a* determines the data-plane resource cannot be fixed via replay operation, the SER recovery agent 804*a* may rely on available EDAC/ECC features in the data-plane in the affected data-plane resource to fix the error.

When the error is not fixable, in some embodiments, the SER recovery agent 804*a* is configured to generate a system report of the error and direct and/or trigger restart operation of the relevant section of the data-plane hardware (e.g., inline card). In some embodiments, the SER recovery agent 804*a* is configured to direct or trigger (1228) restart operation of the system. In FIG. 12, the SER recovery agent 804*a* may signal (1230) the host CPU to prompt the user to initiate the reboot. In other embodiments, the SER recovery agent 804 may signal the date-plane device (e.g., ASIC 116 or NP/RP 104) to restart or reinitialize.

Though not shown, each access to the shadow copy or action performed by the SER recover agent 804*a* may be reported to the SER profiler 602*a*.

Adaptive Memory Scrubbing

Adaptive memory scrubbing module. In another aspect, an adaptive memory scrubbing module is presented. The adaptive memory scrubbing module is configured to refresh memory values in embedded system devices. The adaptive memory scrubbing module may operate with the SER memory protection module and framework, described herein, or a prediction module, also described herein.

The adaptive memory scrubbing module and framework are configured to i) manage on-demand priority scrubbing operations for specific data-plane and hardware resources and ii) perform maintenance scrubbing of each, or a predefined set of, hardware resources at pre-defined intervals. The adaptive memory scrubber module optimizes the scrubbing task (patrol scrubbing) by coordinating patrol/scheduled scrubbing with received feedback, e.g., from the data-plane access driver, that triggers demand scrubbing. The priority scrubbing operations ensures that detected errors are immediately, or as quickly as possible in view of system availability, to address errors of nearby and related components. The maintenance scrubbing is a lower priority operation that ensures that all, or a substantial portion of, data plane resources and hardware resources are scrubbed on a periodic basis. In some embodiments, the adaptive memory scrubbing module is configured to perform scrubbing operation based on a hierarchical schedule. The adaptive memory scrubbing module, in some embodiments, is configured to rely on underlying error detection support, e.g., implemented in EDAC infrastructure.

The adaptive memory scrubbing module is configured, in some embodiments, to receive notification and/or requests to perform priority scrubbing operations from a dynamic memory scrubber prediction module. In some embodiments, the adaptive memory scrubbing module is configured to additionally perform priority scrubbing operations based on notification and/or requests received from a SER memory protection module.

Figure 13:
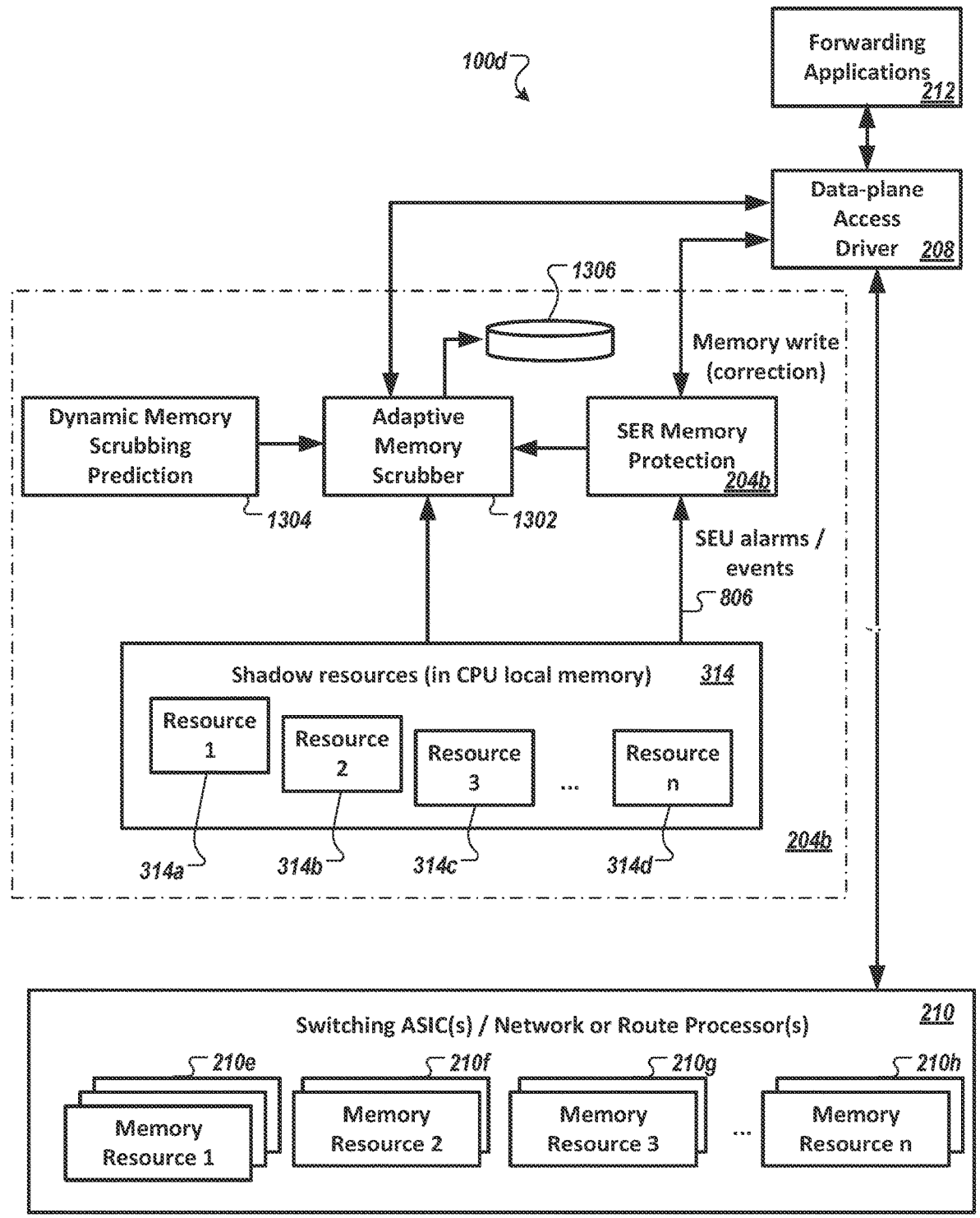
FIG. 13 shows a network device comprising an adaptive memory scrubbing module, in accordance with an illustrative embodiment.

FIG. 13 shows a network device 100 (shown as 100*d*) comprising an adaptive memory scrubbing module 1302, in accordance with an illustrative embodiment. The adaptive memory scrubbing module 1302 is configured to operate as an independent module. In some embodiments, the adaptive memory scrubbing module 1302 may operate and/or integrates with a SER memory protection module 204 (shown as 204*b*) or a dynamic memory scrubber prediction module 1304.

The adaptive memory scrubber module 1302 is configured to optimize the scrubbing task (patrol scrubbing) by received feedback from the data-plane access driver (demand scrubbing), which are also checked for memory errors. In some embodiments, the adaptive memory scrubber module 1302 is configured to receive requests from the SER memory protection module (e.g., SER recovery agent) for specific resources that the SER memory protection module estimates or predicts to be affected by soft errors. In some embodiments, the adaptive memory scrubber module 1302 is configured to receive requests from the dynamic memory scrubber prediction module 1304.

Dynamic memory scrubber prediction module 1304, in some embodiments, is configured to further optimize the system by predicting resources that could benefit from memory scrubbing as well as the appropriate memory scrubbing parameters (e.g., frequency, priority, corrective action). The prediction module 1304 may take inputs from the adaptive memory scrubber module 1302 and identify and/or learn resource error patterns. The patterns are then used to estimate or predict future error patterns or likelihood a given resource having an error.

The operation of the adaptive memory scrubber module 1302 may vary based on whether the hardware resource has, or not have, a shadowed copy or resource. For hardware resources that are not shadowed and are protected by error correction (e.g., ECC), the adaptive memory scrubber module may rely on corrected values from the EDAC module to write back to the corresponding memory location. Scrubbing may be performed frequently to prevent single-bit errors accruing into multi-bit uncorrectable errors. In some embodiments, analysis to determine the frequency/periodicity of the scrubbing may be performed off-system. In other embodiments, the analysis may be performed by the system. For hardware resources that are not shadowed, and where the hardware cannot provide the correct value (e.g., parity or multibit un-correctable errors), the adaptive memory scrubber module 1302 may detect the error and send a request to the SER memory protection module (e.g., SER recovery agent) to correct the error. For hardware resources that are shadowed, data maintained in a hardware resource shadow is used to correct the corresponding memory locations.

Figure 14:
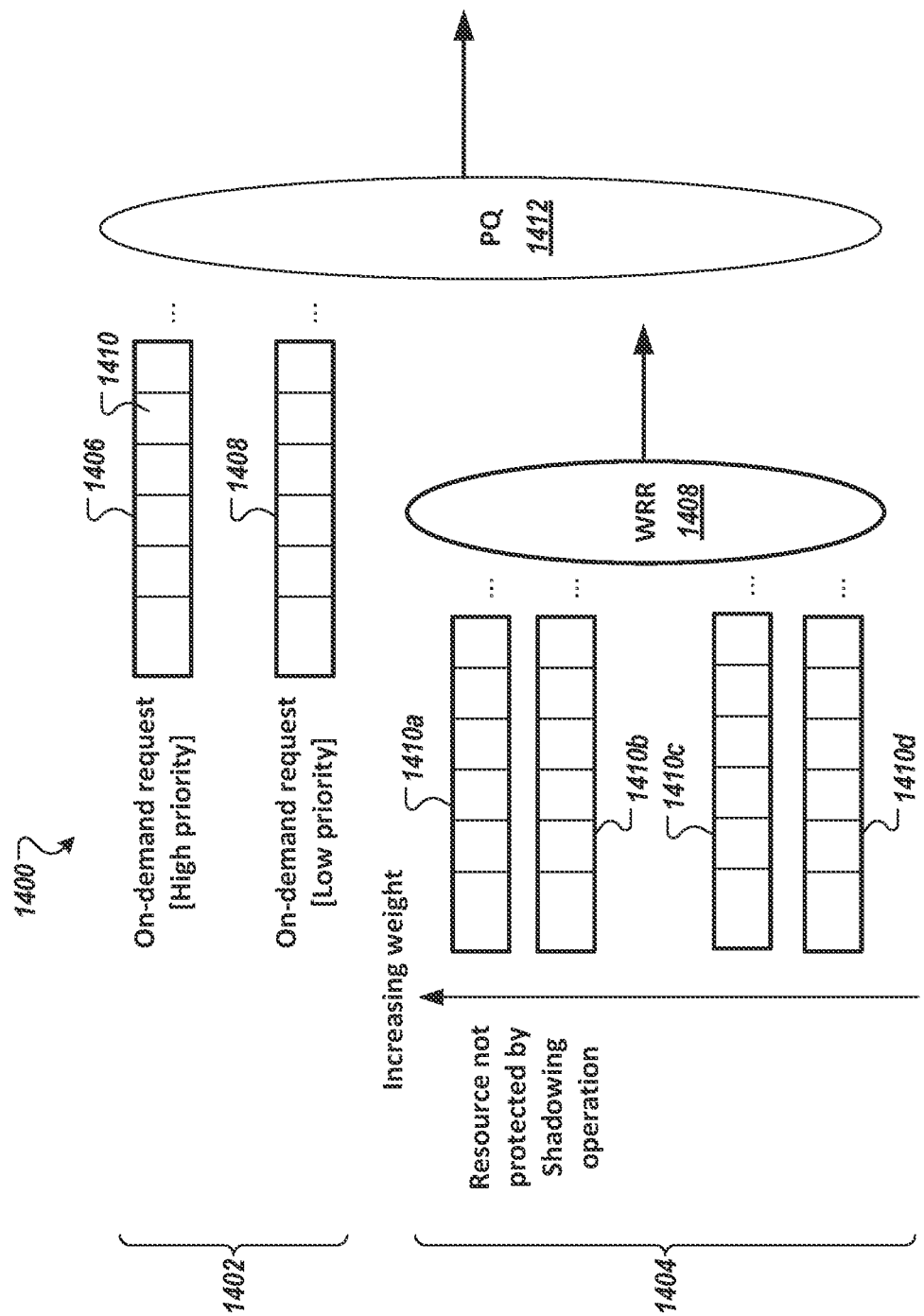
FIG. 14 is a diagram illustrating an example hierarchical scheduling operation implemented in the adaptive memory scrubbing module of FIG. 13, in accordance with an illustrative embodiment.

FIG. 14 is a diagram illustrating an example hierarchical scheduling operation 1400 implemented in the adaptive memory scrubbing module of FIG. 13 (e.g., in adaptive memory scrubber 1302), in accordance with an illustrative embodiment.

In FIG. 14, the hierarchical scheduling operation 1400 includes two or more on-demand request queues (shown as 1402) and a patrol/scheduled scrubbing queue (shown as 1404). The on-demand request queues 1402 includes a first on-demand request queue 1406 configured to track high-priority requests and a second on-demand request queue 1408 configured to track lower-priority requests. Through shown with two queues, the hierarchical scheduling operation 1400 may be configured with 2, 3, 4, 5, 6, 7, 8, 9, 10, 11, 12, 13, 14, 15, 16, 17, 18, 19, or 20 queues. In some embodiments, the hierarchical scheduling operation 1400 is configured with more than 20 queues. The first on-demand request queue 1406, in some embodiments, has a same number of queue elements as the second on-demand request queue 1408. In other embodiments, the first on-demand request queue 1406 has a different number of queue elements (1408) as the second on-demand request queue 1404 (and other on-demand request queues). In some embodiments, each of the first on-demand request queue 1406, and/or second on-demand request queue 1408, has 16, 20, 32, 40, 64, 80, 128, 100, 256, 512, 1024, 2048 number of queue elements (shown as 1410).

Each queue element (e.g., 1410) includes, in some embodiments, a memory address or identifier for a given hardware and/or data plane resource to be scrubbed. In some embodiments, the queue element (e.g., 1410) includes an identifier for a system component. In some embodiments, the priority queue includes addresses and/or addressable identifiers of available shadow copies, and/or indication of available shadow copies, corresponding to the hardware and/or data plane resource. In some embodiments, the priority queue includes an address to a memory location having instructions for the scrubbing operation (e.g., address or identifier of the hardware resource to be scrubbed and/or address or identifier to shadow copy to be used). To this end, in some embodiments, the queue element (e.g., 1406) includes all, or reference to all, the information necessary to performing scrubbing for a given hardware resource of data-plane resource. The hierarchical scheduling operation is configured to perform scrubbing operation on requests from a higher priority queue (e.g., 1406) and ensures that higher priority queues (e.g., 1406) are empty before performing scrubbing operation on requests from a lower priority queue (e.g., 1408).

In some embodiments, the patrol/scheduled scrubbing queue is implemented as a weighted round robin (WRR) queue. Other types of buffers (static or circular) may be used. The scheduled queues may be organized by weights that are assigned to the respective memory resource.

A priority queue submodule 1412 may perform, or direct, scrubbing operations based on requests in the first on-demand request queue 1406 first, then any requests in the second on-demand request queue 1408, and then any requests in the weighted round robin (WRR) queue 1410. Indeed, queue elements having higher weight values would be scrubbed more often. The priority queue submodule 1412 may be implemented in software or customized hardware or a combination of both.

In some embodiments, the adaptive memory scrubber 802 includes an interface to receive requests to skip scrubbing for a given hardware resource. The request may include a pre-defined timeout interval. The interface may receive a request from the data-plane access driver or by the SER recovery agent. The skip scrubbing interface is configured to facilitate the skipping of a next patrol scrubbing cycle (e.g., patrol scrubbing queue) as the memory resource is actively being accessed, making the scrubbing less important.

Figure 15:
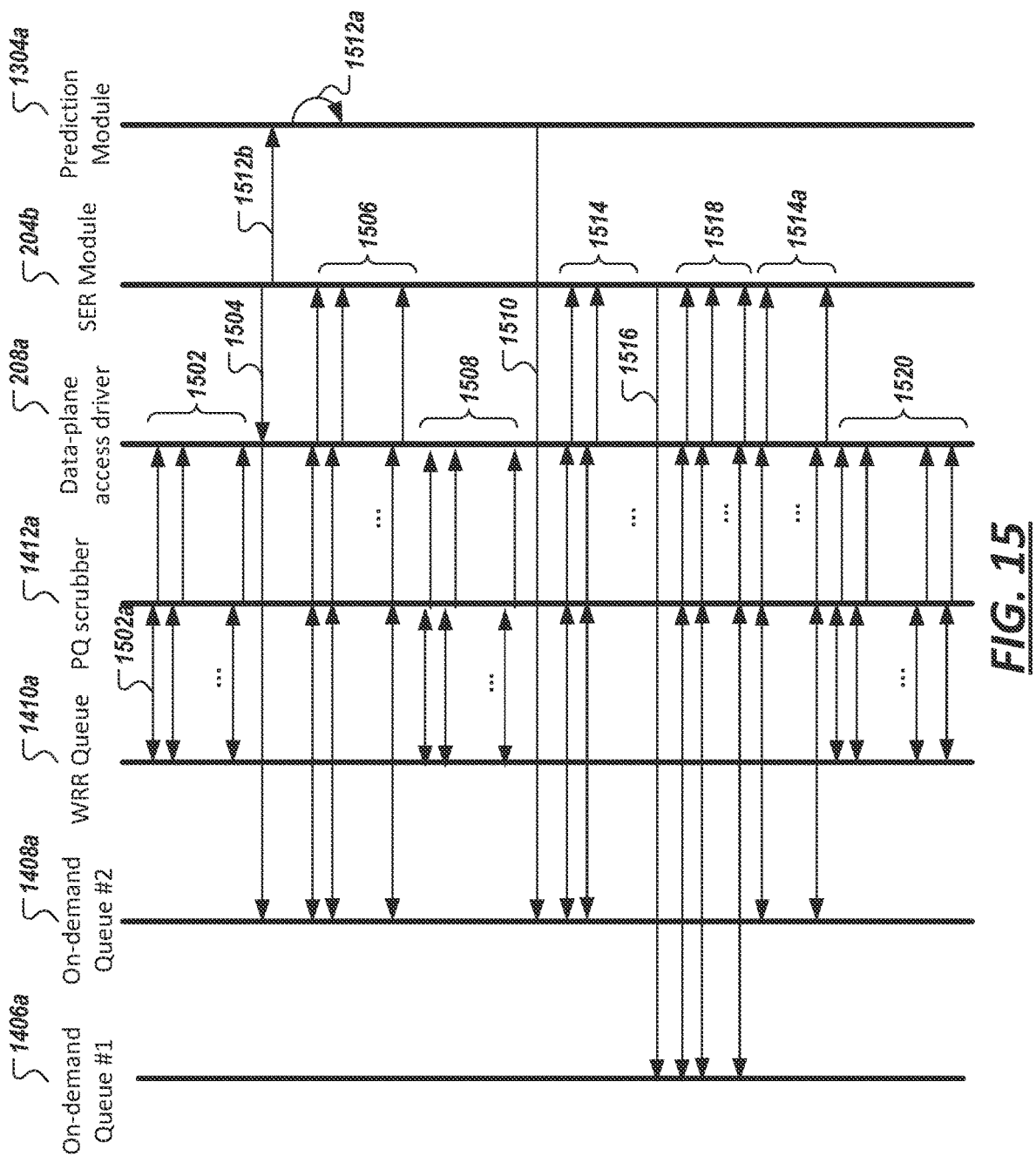
FIG. 15 shows a waterfall diagram of example scrubbing operations performed by an adaptive memory scrubber module, in accordance with an illustrative embodiment.

FIG. 15 shows a waterfall diagram of example scrubbing operations performed by an adaptive memory scrubber module 1302 (shown as 1302*a*), in accordance with an illustrative embodiment. The adaptive memory scrubber module 1302*a* includes a priority queue submodule 1412 (shown as 1412*a*) and a first on-demand request queue 1406 (shown as 1406*a*), a second on-demand request queue 1408 (shown as 1408*a*), and a weighted round-robin queue 1410 (shown as 1410*a*). In FIG. 15, the priority queue submodule 1412*a* is performing patrol scrubbing (shown as 1502) for a given resource.

In the example in FIG. 15, a second-level on-demand scrubbing request is received (1502) from a SER memory module 204 (shown as 204*b*) through the data-plane access driver 208 (shown as 208*d*). The request (1504) is placed in the second on-demand request queue 1408*a*. With a request in queue 1408*a*, the priority queue submodule 1412*a* interrupts the patrol scrubbing operation 1502 and start performing the on-demand scrubbing operation (1506) associated with the on-demand request (e.g., 1504) in the on-demand queue (1408*a*). In some embodiments, the priority queue submodule 1412*a* is configured to perform any non-first-level on-demand requests (e.g., in 1408*a*) once the patrol scrubbing operation for a given WRR queue is completed. In such embodiments, the priority queue submodule 1412*a* is configured to continue (shown as 1508) patrol scrubbing at a next WRR queue once the on-demand request is completed and the on-demand queues are empty.

In other embodiments, the priority queue submodule 1412*a* is configured to immediately interrupt a patrol queue operation upon an on-demand queue being received and the on-demand queues are not empty. In such embodiments, once the on-demand request is completed and the on-demand queues (e.g., 1406*a* and 1406*b*) are again empty, the priority queue submodule 1412*a* picks up patrol scrubbing at a last memory location prior to being interrupted by the on-demand scrubbing. Each weighted round-robin queue 1410 may have request to a given hardware resource (e.g., memory device) or usage application (e.g., table). In other embodiments, the priority queue submodule 1412*a* is configured to restart scrubbing at the beginning of a given weighted round-robin queue 1410.

The scrubbing operation (e.g., based on WRR queue or on-demand queue) may vary between hardware resources that are shadowed versus resources that are not shadowed. For hardware resources that are not shadowed and are protected by error correction (e.g., ECC), the adaptive memory scrubber may rely on the corrected value from the EDAC and writes it back to the corresponding memory location. It is important to proactively scrub such memory resources frequently enough, before single-bit errors accrue into multi-bit uncorrectable errors. For hardware resources that are not shadowed, and where hardware protection cannot provide the correct value (e.g., parity or multibit un-correctable errors), the adaptive memory scrubber may detect the error and uses SER memory protection module (e.g., SEU recovery agent) to correct the error. For hardware resources that are shadowed, the behavior of adaptive memory scrubber does not vary between correctable and un-correctable errors. If an error is detected, the data maintained in hardware resource shadows is used to correct the corresponding memory locations.

Memory scrubbing is performed in a non-intrusive operation. When implemented in software (the normal case), it's usually a low-priority task. Typical scrubbing frequencies depend on various factors, e.g., criticality of the resource, susceptibility to memory errors and ranges between minutes to days and consumes CPU and system resources that could be used for other applications. When the system is constantly busy, then memory scrubber may have limited cycles to run.

To demonstrate other aspects of the priority queuing operations (e.g., operation of by the dynamic memory scrubber prediction module and priority queueing mechanisms), in FIG. 15, another second-level on-demand scrubbing request is shown received (1510) from a dynamic memory scrubber prediction module 1304 (shown as 1304a). The dynamic memory scrubber prediction module 1304 estimates or predicts resources that would benefit from memory scrubbing and corresponding memory scrubbing parameters (e.g., frequency, priority, corrective action) for that resource. In some embodiments, the dynamic memory scrubber prediction module 1304a collects statistics of on-demand requests received by the adaptive memory scrubber 1302 and apply weights for the WRR queue according to histograms or statistics of such requests. The dynamic memory scrubber prediction module 1304a may maintain a list of all resources, or a substantial portion of resources, to be patrol scrubbed. The list may be organized by memory section and/or by usages (e.g., by tables).

Referring to FIG. 15, the second-level on-demand scrubbing request 1510 was generated from processing (shown as 1512a) performed at the dynamic memory scrubber prediction module 1304a based on inputs (shown as 1512b) from the SER memory module 204b. Indeed, the dynamic memory scrubber prediction module 1304a may adjusts the weights of the round-robin queue (not shown) as well as generate an on-demand scrubbing request (e.g., 1510). The scrubbing request is generally assigned a next highest available level that is not the highest level, e.g., the second level (e.g., 1408a). Generally, the first level (e.g., 1406a) is reserved for requests requiring immediate action.

Referring to FIG. 15, upon second-level on-demand scrubbing request 1510 being placed in the second on-demand request queue 1408a, the priority queue submodule 1412a interrupts the patrol scrubbing operation 1508 and start performing the on-demand scrubbing operation (1514) associated with the second on-demand request (1510). Assume in this example that the priority queue submodule 1412a now receives (1516) a first-level on-demand scrubbing request in the first-level on-demand queue 1406a (shown here from the SER memory module 204b through the data-plane access driver 208a). Indeed, the SER memory module 204b (e.g., SER recovery agent) is configured to direct a message to the adaptive memory scrubber for on-demand scrubbing. The SER memory module 204b (e.g., SER recovery agent) may classify the on-demand message with a high or low priority designation.

Referring to FIG. 15, with a request in queue 1406a, the priority queue submodule 1412a interrupts the lower-priority on-demand scrubbing operation 1514 and start performing the on-demand scrubbing operation (1518) associated with the on-demand request (e.g., 1516) having the high-priority on-demand queue (1406a). Once on-demand scrubbing from the higher priority queue 1406a is completed, the priority queue submodule 1412a continues with the lower-priority on-demand scrubbing operation (shown as 1514a). And, following completion of the on-demand scrubbing of the lower-priority on-demand scrubbing operation 1514a, the priority queue submodule 1412a continues with patrol scrubbing operations (shown as 1520) from the WRR queue (1410a). Indeed, the priority queue submodule 1412a operates in a hierarchical manner in which requests in higher priority queues are serviced prior to requests in lower priority queues, and requests in on-demand queues are serviced prior to request in patrol queues.

Figure 16:
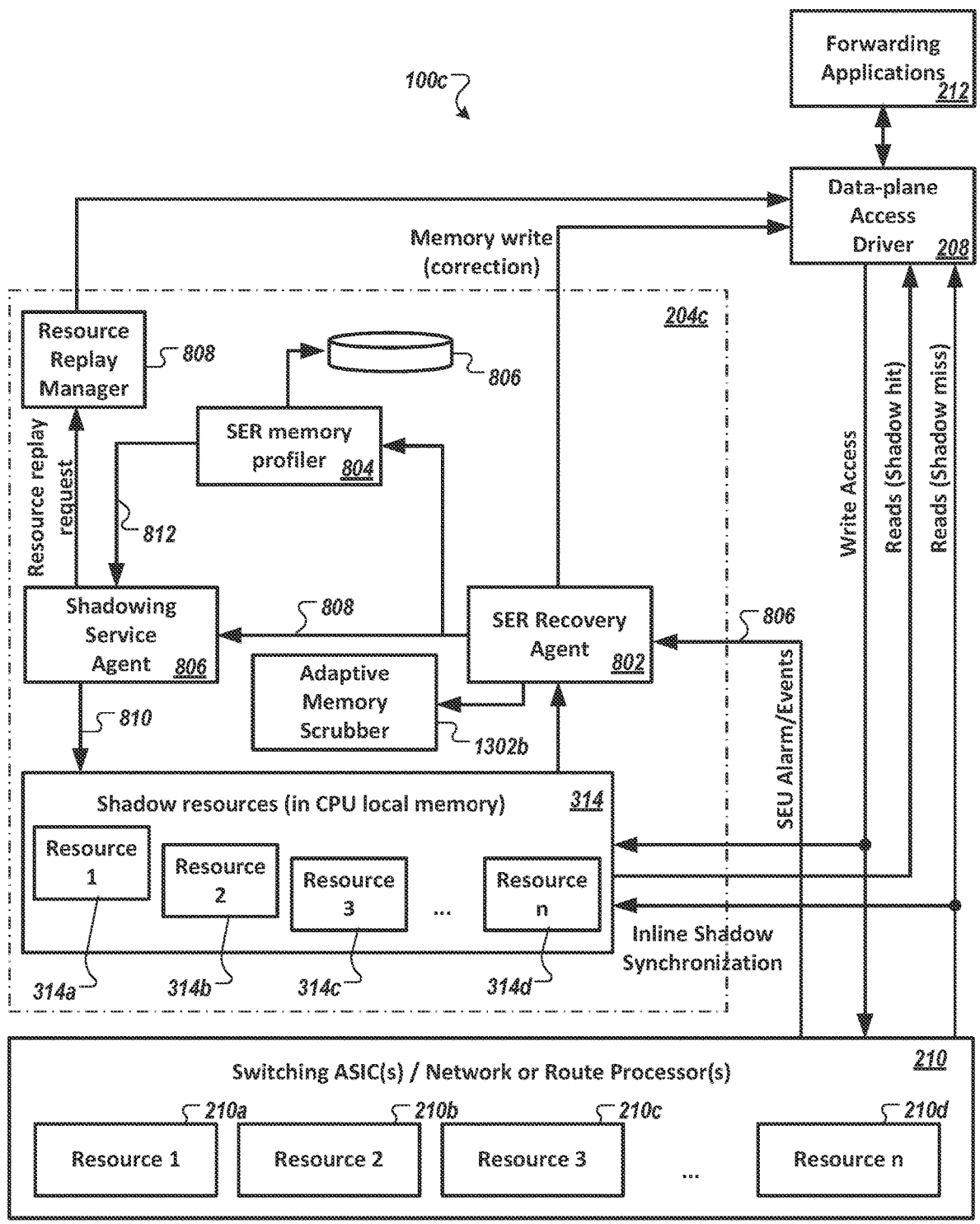
FIG. 16 shows a diagram of a SER memory protection of FIG. 8 configured with an adaptive memory scrubbing module, in accordance with an illustrative embodiment.

FIG. 16 shows a diagram of a SER memory protection module 204 (shown as 204c) of FIG. 8 configured with an adaptive memory scrubbing module 1302 (shown as 1302b), in accordance with an illustrative embodiment.

In FIG. 16, when an SEU event is reported (e.g., via 806 as described in relation to FIG. 8), one technique is to overwrite the entire resource, correcting undetected errors in adjacent memory locations. In some embodiments, the SER memory protection module 204c sends a first high priority queue on-demand scrubbing request to correct the data-plane resource (e.g., entire table) having the error and a second lower priority queue on-demand scrubbing request to correct other data-plane resources associated to the same data-plane device as the erred data-plane resource. Additional lower priority queue requests may be sent based on collected statistics from the SER memory profiler 804, e.g., for nearby system components, e.g., inline cards. As noted above SEU errors tends to occur in spurts to a given set of data-plane devices and system components and nearby components. Though such operation has reduced detection accuracy, it may be an efficient avenue to corrects errors.

For example, assume a SEU error was received at entry 1115 of ARP table of inline card 4. The SER memory protection module 204c (e.g., SER recovery agent 802) may correct, or direct a high priority on-demand request of, the entire ARP table of inline card 4, e.g., from shadow copy, replay operation, etc. to potentially correct any other SEU errors in the ARP table. The SER memory protection module 204c (e.g., SER memory profiler 804) may then correct, or direct a lower priority on-demand request of, the entire MAC table of inline card 4 and all tables of inline card 5 because it has observed that errors in inline card 4 and inline card 5 appear concurrent to one another in the past.

Dynamic Resource Shadowing module for Fast Boot-Up or Fast-upgrades. In another aspect, a framework for an infrastructure is disclosed that leverages the dynamic shadow framework to provide shadow copies of data plane resources as a proxy for data plane devices (e.g., ASICs). FIG. 2 further shows a network device 100a comprising a dynamic resource shadowing module 206 configured to dynamically resource-shadow data-plane resources of the network device 100a for fast boot or fast upgrade operation, in accordance with an illustrative embodiment. As discussed above, by creating shadow copies of data plane resources independent of data plane operations, the shadowed resources may be used to flush the data plane resources during a reboot of the corresponding data place devices, thus reducing network disruption/down time to the time to perform the flush, which may be in the order of seconds.

During fast reboot, the system image that runs on the host CPU loads a same image as previously running. In a fast upgrade, the system image that runs on the host CPU loads a different update image as previously running.

As discussed above, although upgrades are available for applications and operating system executing on the host CPU, because of the disruption to the network, such upgrades are often deferred until more substantial upgrades are required or scheduled. To this end, security and bug fixes may persist for longer duration on a given network equipment. Further, in some operating environments, e.g. real-time controls in factory automation and such, disruption of network connectivity for a minute or more may cause the entire operation line to reset. Reducing disruption time during minor upgrades to a few seconds may increase the frequency that upgrades are performed, thereby improving overall system health and security.

Figure 17:
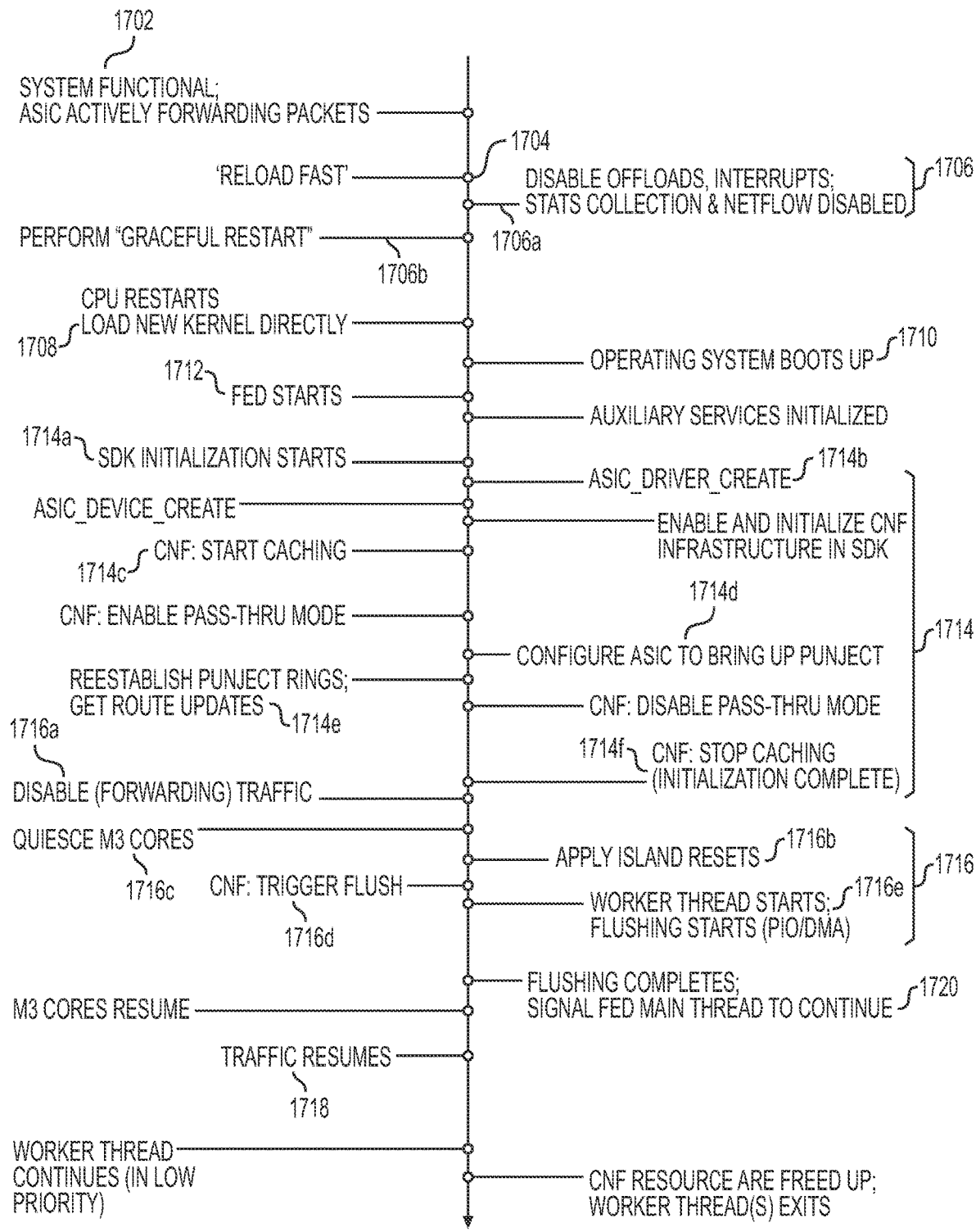
FIG. 17 is a timing diagram for a cache and flush operation of a shadowed resource to perform fast boot-up or fast upgrade in accordance with an illustrative embodiment.

FIG. 17 is a timing diagram for a cache and flush operation of a shadowed resource to perform fast boot-up or fast upgrade in accordance with an illustrative embodiment.

In FIG. 17, the process 1700 begins with the ASIC being shown to actively forward packets (1702). Upon receipt of a fast reload command (shown as "reload fast" 1704), the process 1700 initiates.

Peer related operations are first disabled (1706). In step 1706, statistics and NetFlow collection are disabled (1706a) and graceful restart (1706b) is initiated. Graceful restart allows a routing device undergoing a restart to inform its adjacent neighbors and peers of its condition. During a graceful restart, the restarting device and its neighbors continue forwarding packets without disrupting network performance.

Once ready, the CPU restarts and a new kernel is loaded (1708). As noted above, for reboot/reload, the same kernel/system image previously running is used. For fast upgrade, a different kernel/system image is used. Once the kernel is loaded, the operating system is booted (1710). In network devices manufactured by Cisco Technology, Inc, (San Jose, CA), the Polaris operating system is booted.

Following bootup of the operating system, the forwarding application is initialized in the kernel (shown as "forwarding engine driver (FED starts" 1712) along with various auxiliary services performed by the kernel.

Dynamic resource shadow operation is now performed (1714). In step 1714, the dynamic resource shadow module 206 initializes (shown as "SDK Initialization starts" 1714a) a SDK (software-development kit) that instantiates a shadowing services agent 304, which then creates (shown as "asic_device_create" 1714b) an instance of a resource shadow (both control structures and storage for underlying data). In some embodiments, the data-plane access driver is initialized, and the data-plane access driver is configured to override the shadow creation policies implemented in shadow memory profiler to dynamically create shadow resources on its own.

In FIG. 17, the Dynamic resource shadow operation then starts caching (shown as "CNF: Start caching" 1714c) the ASIC (as a data plane device) by creating a shadow copy of tables (e.g., MAC table, FIB table, RIB table, ACL table) (e.g., data plane resource) of the ASIC in host CPU local memory. At the same time, the cache and flush infrastructure in the dynamic resource shadow is initiated. The caching operation 1714c consumes a substantial portion of the time. Assuming there are 64K entries for each of the 4-5 tables and each entry involves a read access operation through a PCIe interconnect (e.g., at 1300 ns per non-post transaction), the cache time for this example is approximately 0.3-0.4 seconds. The shadow copy thus takes less than 1 second to create. As compared to conventional MAC learning operation and RIB, FIB, ACL table creating operations, which can take several minutes, this operation is substantially faster.

Near the end of the caching operation, the ASIC is configured to bring up punt and inject operations, and a punt and inject ring is reestablished (1714e). Punt refers to the forwarding of packets received at the forwarding plane/data plane being punted to the control plane; inject refers to packets being injected to the forwarding plane/data plane from the control plane. Once caching is completed, initialization of the shadow copy is now complete (1714f).

The flush operation is then performed (1716). In step 1716, the ASIC is first disabled (1716a) and forwarding operation stops. An island reset command is then applied (1716b), which causes the ASIC to reset, and the host CPU core is quiesced (1716c). Flush operation is then initiated (shown as "trigger flush" 1716d) and performed by a worker (shown as "flushing starts (PIO/DMA)" 1716e). For the same example above, flushing performed for 4-5 tables each having 64K entries through the PCIe interconnect (e.g., at 130 ns per transaction), the flush time for this example is approximately 30 to 40 milliseconds. Subsequently, the host CPU core operation is resumed (1718), and forwarding application is signaled (1720) to continue. Indeed, cache and flush operation of a shadowed resource to perform fast boot-up or fast upgrade is substantially faster than conventional boot-up and upgrades.

Dynamic Hierarchical Shadowing

To facilitate fast upgrade and fast boot-up operations, and/or to create version control of data-plane resources for a given ASIC, multiple copies of shadow resources may be created that form a hierarchy. When implemented, assume a layer number N, N−1, N−2, to layer number 1 are created. To form the hierarchy, each underlying layer within a multi-layer hierarchy recursively treats above layers as a single layer or shadow copy. For example, layer number N (as a lowest layer) treats layer number N−1 through Layer number 1 as a single layer and/or copy for shadowing operations. Then, layer number N−1 (as a next lowest layer) in turn treats layer number N−2 through layer number 1 as one layer/copy and so on.

The hierarchical structure may use a hardware or software construct that updates and automatically propagated changes made at an underlying layer to any, or pre-defined, above layers. To this end, recent updates to a give data-plane resource and made to an underlying layer can be automatically propagated to layers created at other time instance.

In another aspect of hierarchical shadowing structure, the multiple copies that pertain to a given ASIC resource and the ASIC resource itself may have identical data, non-identical data, or a combination of both. In the hierarchical shadowing structure, overlay mode implements the case of non-identical copies of data at multiple layers in the hierarchy and is a deviation from the general hierarchical shadowing structure. In other words, a layer that implements overlay mode is treated as the data-plane device and the operations of reads/writes do not involve the layer below (e.g., to act as a sink).

In some embodiments, a layer that implements overlay mode is configured to synchronize its data with the layers below (including data-plane device) based on the desired application requirements. Indeed, overlay mode may be enabled for a given layer on a temporary basis, or for an extended period of time.

Fast programming of data-plane resources is another application that may use the cache and flush techniques as described herein. The fast programming operation may be used to flip a set of tables with another second set of tables corresponding to different snapshots (e.g., in time). Example of such tables includes forwarding database, ACLs, etc.

Example Use Case of Dynamic Hierarchical Shadowing

The dynamic hierarchical shadowing operation may be implemented to create a hierarchical structure where each layer in the hierarchical structure pertains, and thus includes data, pertaining to different times. The layer can include data for past instances of a data plane resource. The layer can include data for a future instance of a data plane resource (e.g., a data to be flushed and replace an existing data plane resource).

This layered information may be used to restore the ASIC resource to specific snapshot that is desired. Example applications of future snapshot restoration are Fast Software Upgrade and Fast-Boot. ASIC resource shall contain a different set of configured data than the shadow resources. At a specific point in the timeline, as dictated by the supporting applications, flushing operation brings the hierarchy of shadow copies, including DP resource synchronized (Layer N and below).

For example, a hierarchical shadowing structure comprising two layers may be instantiated: layer 1 and layer 2. Layer 2 resides above layer 1. Such hierarchical shadowing structure may be used for both fast update and fast upgrade operation where data in layer 1 pertains to fast update operation (past or near future of the forwarding plane) and layer 2 pertains to a fast upgrade operation (alternate future of the forwarding plane with a modified host CPU or ASIC operation).

Figure 18:
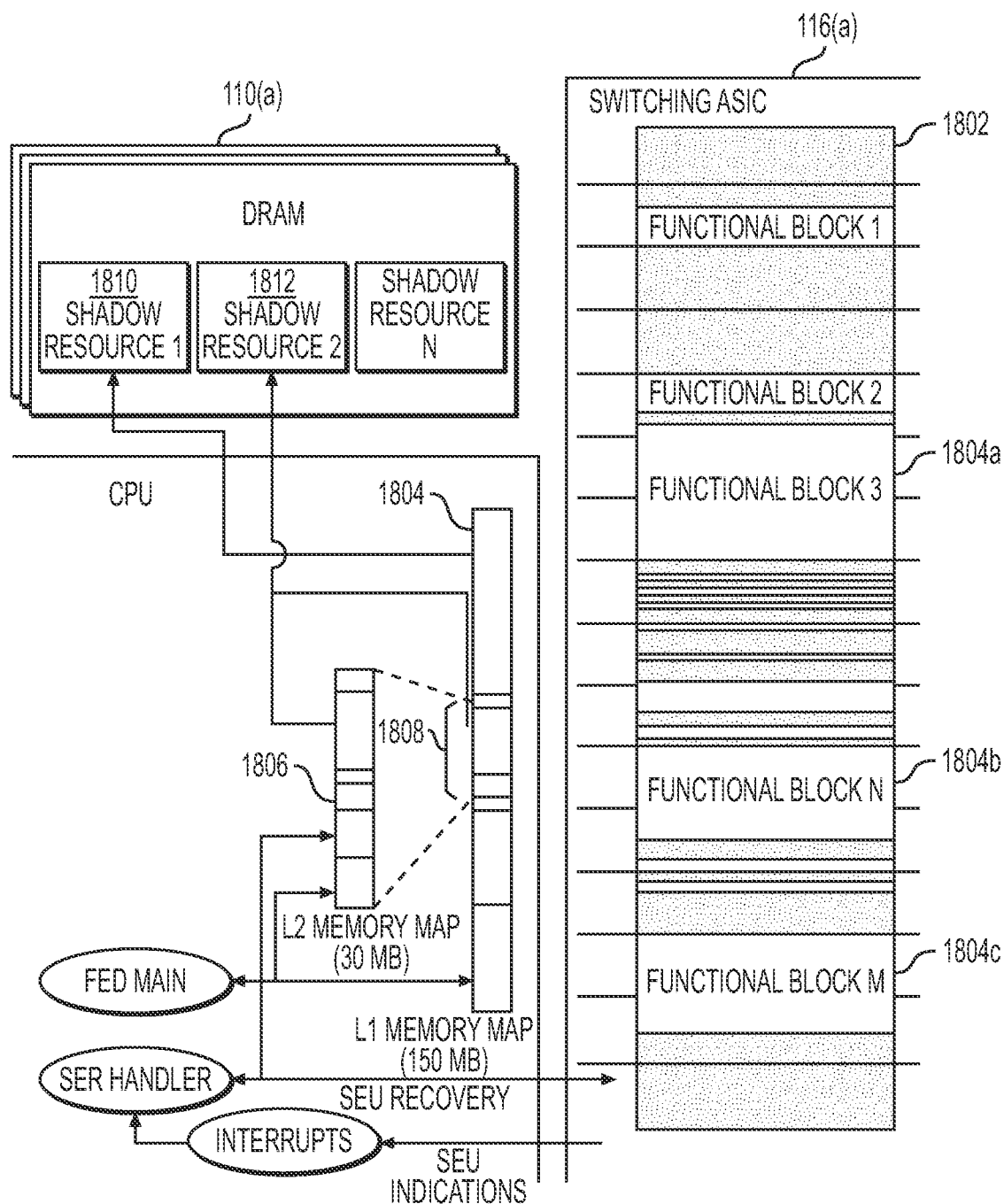
FIG. 18 shows a diagram of a hierarchical shadowing structure comprising two layers, in accordance with an illustrative embodiment.

FIG. 18 shows a diagram of a hierarchical shadowing structure comprising two layers, in accordance with an illustrative embodiment. In FIG. 18, data-plane resources of an ASIC 116 (shown as 116a) are mapped to a memory structure 1802 or to a structure having several functional blocks (e.g., pertaining to a table or functional resources, etc.). In FIG. 18, a first layer 1804 (shown as "L1 memory map" 1804) is created that spans and includes only a first set of functional blocks (shown as "block 3" 1804a to blocks "N" 1804b and blocks "M" 1804c). The first layer 1804 is stored in a first shadow resource (shown as "Shadow resource 1" 1810) in host CPU local memory 110 (shown as 110a). A second layer 1806 (shown as "L2 memory map" 1806) comprises a portion 1808 of the first layer 1804 and is stored in a second shadow resource (shown as "Shadow resource 2" 1812). To this end, when synchronization is enabled, an update to any of the functional blocks (e.g., 1804a, 1804b, 1804c) in memory 1802 is synchronized to the first layer 1804 (and thus updated in the shadow copy 1810). Where the update at the memory 1802 also pertains to portion 1808, the second layer 1806 is also synchronized (thus updating the shadow copy 1812).

Figure 19:
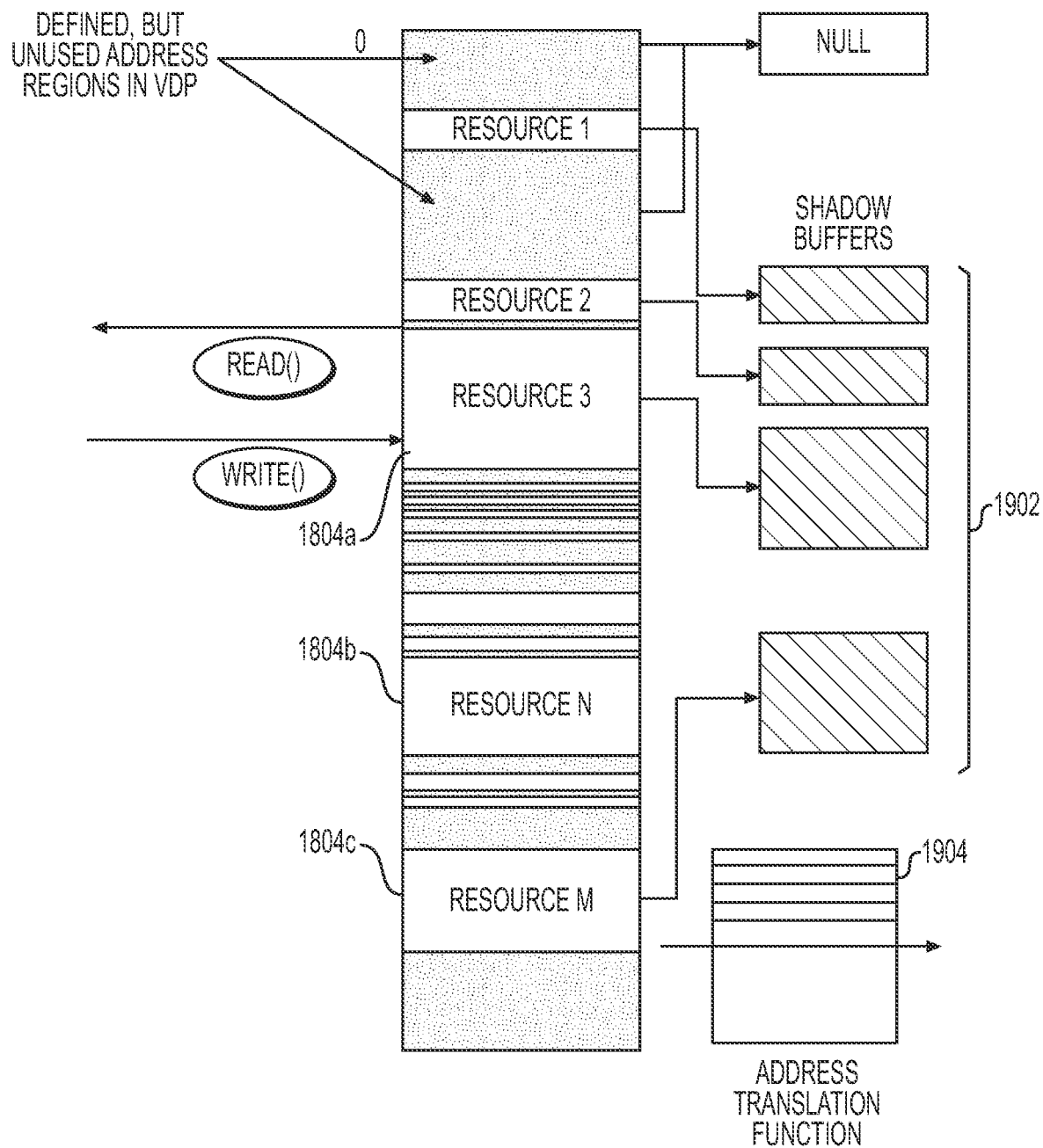
FIG. 19 shows a process to create layers of the hierarchical shadowing structure from functional blocks of data plane resources of an ASIC, in accordance with an illustrative embodiment.

FIG. 19 shows a process to create layers of the hierarchical shadowing structure from functional blocks of data plane resources of an ASIC in accordance with an illustrative embodiment. In FIG. 19, the functional blocks (e.g., 1804a, 1804b, 1804c) are maintained and aggregated as a shadow buffer 1902. Non-functional blocks are nulled and removed or not included in the aggregation. Addresses of the function blocks are also maintained and translated to shadow resource memory address (1904).

It should be understood that the various techniques described herein, including the dynamic hardware resource protection module, may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Embodiments of the network device (e.g., 100, 100a, 100b, 100c, 100d, etc.) may be implemented, in whole or in part, in virtualized network hardware in addition to physical hardware.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents.

What is claimed is:

1. A network device comprising:
one or more processors; and
memory having instructions stored thereon that, when executed by the one or more processors, cause the network device to:
track read accesses of a plurality of data plane resources of the network device through a bus interconnect;
determine, for each read access, whether a shadow copy of a corresponding data plane resource of the plurality of data plane resources is available, wherein the read access is considered a shadow hit if the shadow copy is available and a shadow miss hit if the shadow copy is not available;
generate a shadow copy of a first data plane resource of the plurality of data plane resources if a number of shadow misses associated with the first data plane resource meets an addition criterion, wherein the shadow copy is generated by at least one of: (i) creating an instance of the shadow copy and then synchronizing the shadow copy with configuration data stored in a data plane database, or (ii) generating a null structure of the first data plane resource and updating each instance in the null structure as subsequent read accesses are performed; and
perform a correction of the first data plane resource using the shadow copy of the first data plane resource responsive to receiving a memory error notification associated with the first data plane resource.

2. The network device of claim 1, wherein the instructions further cause the network device to:
determine, for any of the plurality of data plane resources that have an associated shadow copy available, a frequency of read accesses of the associated shadow copy based on shadow hits; and
discard a shadow copy of a second data plane resource of the plurality of data plane resources if the frequency of read accesses meets a removal criterion.

3. The network device of claim 1, wherein the instructions further cause the network device to:

initiate memory scrubbing of one or both of: (i) all instances of the first data plane resource based on the shadow copy, or (ii) any additional ones of the plurality of data plane resources having a determined association to the first data plane resource.

4. The network device of claim 1, wherein the addition criterion is calculated from a weighted moving average based on the number of shadow misses associated with the first data plane resource.

5. The network device of claim 1, wherein the addition criterion is a percentage of misses.

6. The network device of claim 1, wherein the instructions further cause the network device to:
update a list of available shadow copies associated the plurality of data plane resources to indicate that the shadow copy of the first data plane resource was generated.

7. The network device of claim 6, wherein the list includes, for each of the plurality of data plane resources having an available shadow copy, an address for a data plane resource instance in the shadow copy and an indication whether the shadow copy instance is synchronized or instantiated.

8. The network device of claim 1, wherein the each read access includes an address of an associated one of the plurality of data plane resources or an instance of the associated one of the plurality of data plane resources.

9. The network device of claim 1, wherein the instructions further cause the network device to:
receive the memory error notification via polling or via an interrupt.

10. The network device of claim 1, wherein the memory error notification is associated with a soft event upset (SEU) error.

11. The network device of claim 1, wherein the plurality of data plane resources are associated with at least one of a media access control (MAC) address table, a forwarding information base (FIB) table, a routing information base (RIB) table, an access control list (ACL) table, or an address resolution protocol (ARP) table.

12. A method comprising:
tracking, by one or more processors of a computing device, read accesses of a plurality of data plane resources of the computing device through a bus interconnect the computing device;
determining, by the one or more processors, for each read access, whether a shadow copy of a corresponding data plane resource of the plurality of data plane resources is available, wherein the read access is considered a shadow hit if the shadow copy is available and a shadow miss hit if the shadow copy is not available;
generating, by the one or more processors, a shadow copy of a first data plane resource of the plurality of data plane resources if a number of shadow misses associated with the first data plane resource meets an addition criterion, wherein the shadow copy is generated by at least one of: (i) creating an instance of the shadow copy and then synchronizing the shadow copy with configuration data stored in a data plane database, or (ii) generating a null structure of the first data plane resource and updating each instance in the null structure as subsequent read accesses are performed; and
performing, by the one or more processors, a correction of the first data plane resource using the shadow copy of the first data plane resource responsive to receiving a memory error notification associated with the first data plane resource.

13. The method of claim 12, further comprising:
determining, by the one or more processors, for any of the plurality of data plane resources that have an associated shadow copy available, a frequency of read accesses of the associated shadow copy based on shadow hits; and
discarding, by the one or more processors, a shadow copy of a second data plane resource of the plurality of data plane resources if the frequency of read accesses meets a removal criterion.

14. The method of claim 12, further comprising:
performing memory scrubbing of one or both of: (i) all instances of the first data plane resource based on the shadow copy, or (ii) any additional ones of the plurality of data plane resources having a determined association to the first data plane resource.

15. The method of claim 12, wherein the addition criterion is calculated from a weighted moving average based on the number of shadow misses associated with the first data plane resource or wherein the addition criterion is a percentage of misses.

16. The method of claim 12, further comprising:
updating, by the one or more processors, a list of available shadow copies associated the plurality of data plane resources to indicate that the shadow copy of the first data plane resource was generated, wherein the list includes, for each of the plurality of data plane resources having an available shadow copy, an address for a data plane resource instance in the shadow copy and an indication whether the shadow copy instance is synchronized or instantiated.

17. The method of claim 12, wherein the each read access includes an address of an associated one of the plurality of data plane resources or an instance of the associated one of the plurality of data plane resources.

18. The method of claim 12, further comprising:
receiving, by the one or more processors, the memory error notification via polling or via an interrupt.

19. The method of claim 12, wherein the memory error notification is associated with a soft event upset (SEU) error.

20. The method of claim 12, wherein the plurality of data plane resources are associated with at least one of a media access control (MAC) address table, a forwarding information base (FIB) table, a routing information base (RIB) table, an access control list (ACL) table, or an address resolution protocol (ARP) table.

* * * * *

UNITED STATES PATENT AND TRADEMARK OFFICE
CERTIFICATE OF CORRECTION

| | | |
|---|---|---|
| PATENT NO. | : 12,135,622 B2 | Page 1 of 1 |
| APPLICATION NO. | : 18/484765 | |
| DATED | : November 5, 2024 | |
| INVENTOR(S) | : Riaz Khan et al. | |

It is certified that error appears in the above-identified patent and that said Letters Patent is hereby corrected as shown below:

In the Drawings

On sheet 3 of 19, in Figure 3, reference numeral 308, Line 1, delete "Dynanmic" and insert -- Dynamic --.

In the Specification

In Column 4, Line 8, after "around" insert -- 70 --.

In Column 7, Line 28, delete "B CAM;" and insert -- BCAM; --.

In Column 25, Line 48, delete "Shadowing Services" and insert -- shadowing services --.

In Column 35, Line 8, delete "fast'" and insert -- fast" --.

In Column 35, Line 41, delete "Dynamic" and insert -- dynamic --.

In Column 36, Line 23, delete "Layer" and insert -- layer --.

Signed and Sealed this
Twenty-second Day of April, 2025

Coke Morgan Stewart
*Acting Director of the United States Patent and Trademark Office*